(12) United States Patent
Walker et al.

(10) Patent No.: US 12,045,622 B2
(45) Date of Patent: Jul. 23, 2024

(54) INPUT CHANNEL PROCESSING FOR TRIGGERED-INSTRUCTION PROCESSING ELEMENT

(71) Applicant: Arm Limited, Cambridge (GB)

(72) Inventors: Matthew James Walker, Cambridge (GB); Mbou Eyole, Soham (GB); Giacomo Gabrielli, Cambridge (GB); Balaji Venu, Cambridge (GB)

(73) Assignee: Arm Limited, Cambridge (GB)

( * ) Notice: Subject to any disclaimer, the term of this patent is extended or adjusted under 35 U.S.C. 154(b) by 8 days.

(21) Appl. No.: 17/941,404

(22) Filed: Sep. 9, 2022

(65) Prior Publication Data

US 2024/0086201 A1 Mar. 14, 2024

(51) Int. Cl.
*G06F 9/38* (2018.01)
(52) U.S. Cl.
CPC .......... *G06F 9/3856* (2023.08); *G06F 9/3802* (2013.01)
(58) Field of Classification Search
CPC .............................. G06F 9/3802; G06F 9/3856
See application file for complete search history.

(56) References Cited

U.S. PATENT DOCUMENTS

| | | | | |
|---|---|---|---|---|
| 7,814,242 | B1 * | 10/2010 | Wentzlaff | G06F 3/0656 710/36 |
| 2003/0041216 | A1 * | 2/2003 | Rosenbluth | G06F 9/383 712/E9.02 |
| 2017/0192921 | A1 * | 7/2017 | Wang | G06F 9/3004 |
| 2020/0319923 | A1 | 10/2020 | Ro | |
| 2021/0216318 | A1 | 7/2021 | Langhammer | |
| 2021/0286755 | A1 | 9/2021 | Vorbach | |
| 2022/0121448 | A1 | 4/2022 | Baronne | |
| 2022/0342633 | A1 * | 10/2022 | Shveidel | G06F 9/52 |
| 2023/0195469 | A1 * | 6/2023 | Bandishte | G06F 9/3848 712/239 |

OTHER PUBLICATIONS

Parashar et al, "Efficient Spatial Processing Element Control Via Triggered Instructions", Published by the IEEE Computer Society, May/Jun. 2014, pp. 120-137.

(Continued)

*Primary Examiner* — Michael J Metzger
(74) *Attorney, Agent, or Firm* — NIXON & VANDERHYE P.C.

(57) ABSTRACT

One or more triggered-instruction processing elements are provided, a given triggered-instruction processing element comprising execution circuitry to execute processing operations in response to instructions according to a triggered instruction architecture. Input channel processing circuitry receives a given tagged data item (comprising a data value and a tag value) for a given input channel, and in response controls enqueuing of the data value of the given tagged data item to a selected buffer structure selected from among at least two buffer structures mapped onto register storage accessible to one or more of the triggered-instruction processing elements in response to a computation instruction for controlling performance of a computation operation. The selected buffer structure is selected based at least on the tag value, so data values of tagged data items specifying different tag values for the given input channel are allocatable to different buffer structures.

19 Claims, 12 Drawing Sheets

(56) References Cited

OTHER PUBLICATIONS

Repetti et al., "Pipelining a Triggered Processing Element", Association for Computing Machinery MICRO-50, Oct. 14-18, 2017, pp. 96-108.
U.S. Appl. No. 17/941,387, filed Sep. 9, 2022, Walker et al.
Notice of Allowance dated Dec. 28, 2023 for U.S. Appl. No. 17/941,387, 10 pages.

* cited by examiner

INPUT CHANNEL PROCESSING FOR TRIGGERED-INSTRUCTION PROCESSING ELEMENT

BACKGROUND

Technical Field

The present technique relates to the field of data processing.

TECHNICAL BACKGROUND

Conventional processor architectures tend to operate according to a program-counter based architecture, in which a program counter indicates a point of program flow reached in the execution of a program, and the correct program flow order is based on sequential processing of instructions in the order in which they are stored in memory, apart from at branch instructions which trigger a non-sequential jump from an instruction at one address to an instruction at another address. At each branch point, there are typically only two options for the instruction to execute next—either the next sequential instruction after the branch (if the branch is not taken), or the instruction at the target address of the branch (if the branch is taken).

An alternative approach is to provide a triggered instruction architecture, where a pool of triggered instructions is defined with no predefined order in which the triggered instructions are to be executed. Each triggered instruction specifies one or more trigger conditions which define events or conditions that are required to be satisfied by machine state to allow the triggered instruction to be issued for execution. The triggered instruction can also specify one or more trigger actions for updating the machine state used to evaluate trigger conditions for the triggered instructions. In each cycle of selecting an instruction to be issued next, a processing element operating according to the triggered instruction architecture can review whether the trigger conditions for multiple triggered instructions are satisfied and issue an instruction for which the corresponding trigger conditions are met. At each decision point, there can be more than two options for which instructions is executed next, with the selection between those options depending on whether the trigger conditions for each of the options are satisfied. As a triggered instruction itself specifies the conditions necessary for its execution to commence and can also perform a computation, control flow managing instructions such as branch instructions can be eliminated, allowing more of the available instruction processing bandwidth to be used for computation, improving processing performance.

SUMMARY

At least some examples of the present technique provide an apparatus comprising:
at least one triggered-instruction processing element, a given triggered-instruction processing element comprising execution circuitry to execute processing operations in response to instructions according to a triggered instruction architecture; and input channel processing circuitry to receive a given tagged data item for a given input channel, the given tagged data item comprising a data value and a tag value, and in response to receipt of the given tagged data item to control enqueuing of the data value of the given tagged data item to a selected buffer structure selected from among a plurality of buffer structures mapped onto register storage which is accessible to one or more of said at least one triggered-instruction processing element in response to a computation instruction for controlling performance of a computation operation; in which:
the input channel processing circuitry is configured to select the selected buffer structure based at least on the tag value, so that data values of tagged data items specifying different tag values for the given input channel are allocatable to different buffer structures of the plurality of buffer structures.

At least some examples of the present technique provide a method for an apparatus comprising at least one triggered-instruction processing element, a given triggered-instruction processing element comprising execution circuitry to execute processing operations in response to instructions according to a triggered instruction architecture;
the method comprising:
receiving a given tagged data item for a given input channel, the given tagged data item comprising a data value and a tag value; and
in response to receipt of the given tagged data item, controlling enqueuing of the data value of the given tagged data item to a selected buffer structure selected from among a plurality of buffer structures mapped onto register storage which is accessible to one or more of said at least one triggered-instruction processing element in response to a computation instruction for controlling performance of a computation operation; in which:
the selected buffer structure is selected based at least on the tag value, so that data values of tagged data items specifying different tag values for the given input channel are allocatable to different buffer structures of the plurality of buffer structures.

At least some examples of the present technique provide a non-transitory storage medium storing computer-readable code for fabrication of an apparatus comprising:
at least one triggered-instruction processing element, a given triggered-instruction processing element comprising execution circuitry to execute processing operations in response to instructions according to a triggered instruction architecture; and
input channel processing circuitry to receive a given tagged data item for a given input channel, the given tagged data item comprising a data value and a tag value, and in response to receipt of the given tagged data item to control enqueuing of the data value of the given tagged data item to a selected buffer structure selected from among a plurality of buffer structures mapped onto register storage which is accessible to one or more of said at least one triggered-instruction processing element in response to a computation instruction for controlling performance of a computation operation; in which:
the input channel processing circuitry is configured to select the selected buffer structure based at least on the tag value, so that data values of tagged data items specifying different tag values for the given input channel are allocatable to different buffer structures of the plurality of buffer structures.

Further aspects, features and advantages of the present technique will be apparent from the following description of examples, which is to be read in conjunction with the accompanying drawings.

DESCRIPTION OF EXAMPLES

Figure 1:
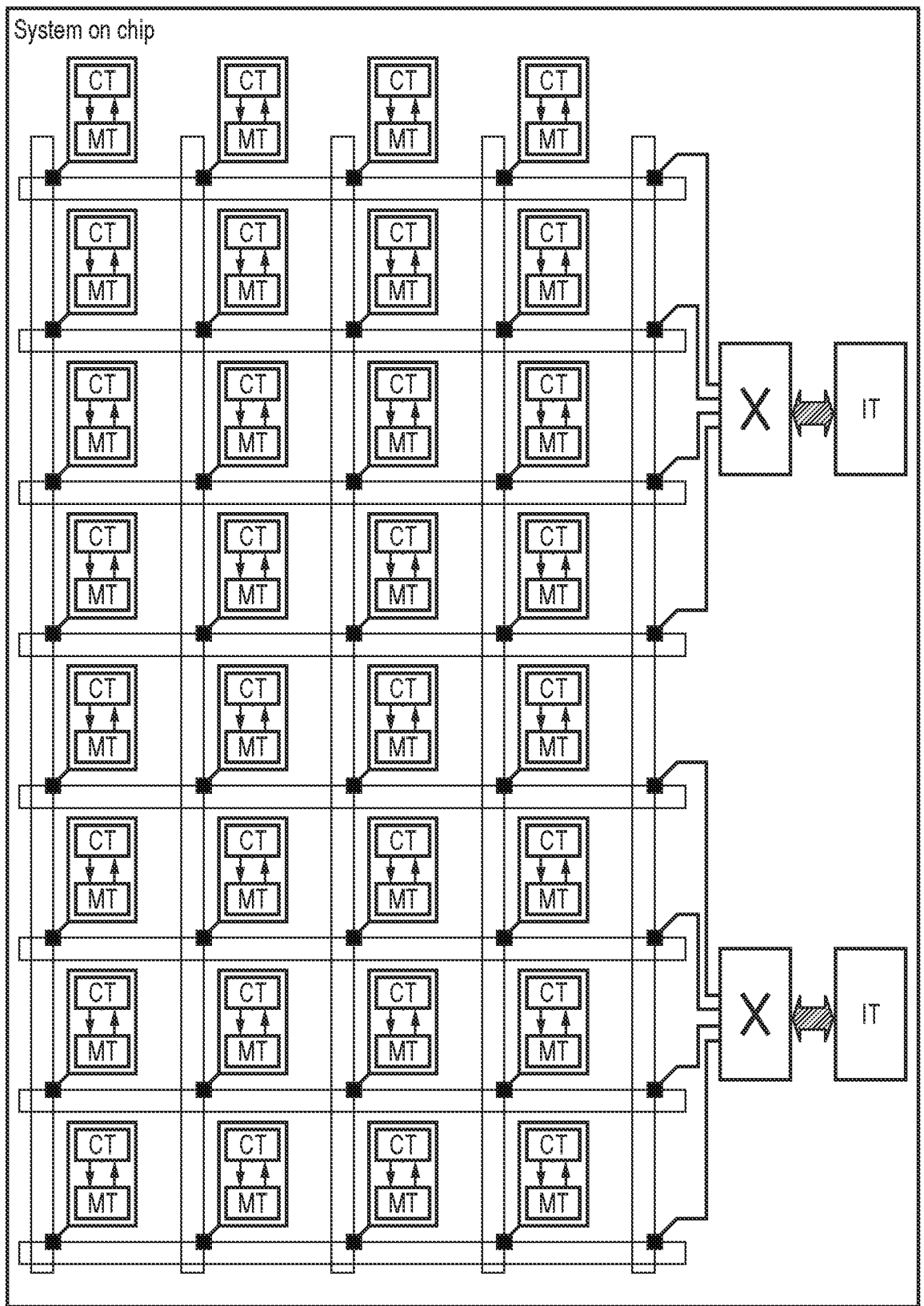
FIG. 1 illustrates an apparatus comprising a number of triggered-instruction processing elements coupled by an on-chip communication interconnect.

A given triggered-instruction processing element comprises execution circuitry to execute processing operations in response to instructions according to a triggered instruction architecture. The triggered-instruction processing element can access register storage (either local to the triggered-instruction processing element or outside the triggered-instruction processing element) based on register specifiers specified by the instructions executed by the triggered-instruction processing element.

There can be a challenge in marshalling the flow of data into a given triggered-instruction processing elements. For a given triggered-instruction processing element, one or more input channels may be defined on which data can be supplied to that triggered-instruction processing element. A given tagged item received on a given input channel comprises a data value and a tag value.

In the examples below, input channel processing circuitry is provided to receive a given tagged data item for a given input channel, the given tagged data item comprising a data value and a tag value, and in response to receipt of the given tagged data item to control enqueuing of the data value of the given tagged data item to a selected buffer structure selected from among a plurality of buffer structures mapped onto register storage accessible to one or more triggered-instruction processing elements in response to a computation instruction for controlling performance of a computation operation. The input channel processing circuitry is configured to select the selected buffer structure based at least on the tag value, so that data values of tagged data items specifying different tag values for the given input channel are allocatable to different buffer structures of the plurality of buffer structures.

Hence, as input channel processing circuitry is provided (in hardware) to take a given tagged data item received on an input channel and enqueue the associated data directly into a buffer structure that is accessible to at least one triggered-instruction processing element in response to a computation instruction (i.e. an instruction which can also perform a computation instruction to process the data from the buffer structure or to generate a data value to be output to the buffer structure), this means that there is no need for the triggered-instruction processing element to execute a dedicated load instruction to obtain the input data from memory and put it in the register storage. By eliminating at least some such load instructions, this means that a larger fraction of the pool of triggered instructions supported by a given triggered-instruction processing element can be used for computation, helping to improve performance.

Also, as data values of tagged data items specifying different tag values can be allocated to different buffer structures by the input channel processing circuitry, this means that even if a buffer used to buffer data items with one tag value becomes full, this need not block the processing of data items specifying a different tag value on the same input data channel. This can help to improve performance.

This technique can be applied in examples which comprise a single triggered-instruction processing element.

However, in practice, a constraint associated with triggered instruction architecture is that there may be a practical limit on the number of triggered instructions which can be monitored for occurrence of their associated trigger conditions by a given triggered-instruction processing element. Therefore, it can be useful to provide a number of triggered-instruction processing elements, so that the processing of a given software workload can be unrolled in space across the triggered-instruction processing elements with each processing element processing a certain subset of the instructions defined for the overall software workload.

The triggered-instruction processing elements may be coupled by an on-chip communication interconnect. The input channel processing circuitry can be particularly useful in the case when an on-chip communication interconnect couples multiple triggered-instruction processing elements, as the reduced likelihood of blocking of received input channel data at the triggered-instruction processing element (and hence less likelihood of back pressure to the on-chip communication interconnect stalling interconnect flow of data) means that the on-chip communication interconnect does not need to expend as much resource on implementing more complex routing protocols (such as use of virtual channels) for reducing blocking, and so a simpler routing protocol can be implemented on the on-chip communication interconnect. This can help to reduce power consumption for the apparatus as a whole by reducing the amount of circuit logic associated with the routers on the interconnect.

The given triggered-instruction processing element may comprise triggered-instruction storage circuitry to store a trigger-checking pool of two or more triggered instructions each specifying a trigger condition field for providing trigger condition information indicative of at least one trigger condition for controlling whether the triggered instruction is to be issued for execution and a trigger action field for providing trigger action information indicative of at least one trigger action for updating machine state in response to the triggered instruction; and instruction issuing circuitry to issue for execution a triggered instruction for which the machine state is determined or predicted to satisfy the at least one trigger condition.

Hence, in each cycle of selecting an instruction to issue next, multiple instructions may be checked for whether they satisfy their trigger conditions (rather than evaluating conditions for a single branch instruction as in program-counter based architectures). It will be appreciated that the trigger conditions for the multiple instructions considered in a given cycle of selecting an instruction to issue next could be checked sequentially or in parallel within that cycle. For example, an instruction with highest priority for issue could be checked first, followed by the next highest priority instruction if the highest priority instruction does not have its trigger conditions satisfied, followed by the third highest priority instruction if the second highest priority instruction does not have its trigger conditions satisfied, and so on until an instruction having its trigger conditions satisfied is found. Alternatively, trigger conditions for multiple instructions could be checked in parallel. Nevertheless, in a given cycle of selecting an instruction to issue next, there can be more than two options of which instruction to select for issue next.

The evaluation of the trigger conditions for triggered instructions may be performed at the stage of issuing the instructions for execution, rather than when the instructions are executed as one might expect for branch instructions in a program-counter based architecture.

Some implementations may provide trigger condition prediction circuitry to predict which triggered instructions are expected to have their trigger conditions satisfied, before those trigger conditions actually become satisfied by the machine state. This can allow triggered instructions to be issued for execution without waiting for the trigger conditions to actually occur. The predictions can be based on prediction state set by the prediction circuitry based on analysis of the sequence of triggered instructions issued in response to previous occurrences of certain patterns of trigger conditions. For example, if a number of triggered instructions are executed in a particular sequence on one occasion, it may be more likely that the same sequence will be seen again and so the prediction circuitry can learn to control the instruction issuing circuitry to issue the triggered instructions in a similar sequence in future without waiting for the actual trigger conditions of the later instructions to occur before issuing those instructions. Hence, in the references to trigger conditions made in this application, it will be understood that while these trigger conditions defined the conditions architecturally required to be satisfied in order for the instructions to be issued, in practice the use of prediction may mean that triggered instructions may be issued speculatively without those trigger conditions yet having been satisfied. If the prediction is correct then performance can be improved. If the prediction is incorrect then incorrectly issued instructions can be flushed and processing resumed from a triggered instruction whose trigger condition was satisfied. By using speculation in this manner, pipeline utilisation and hence performance can be improved, by eliminating pipeline bubbles caused by waiting for the result of one instruction before issuing the next.

In some examples, the trigger condition for a given triggered instruction may depend not only on the trigger condition field of that instruction, but also on control state stored in a control register, which may be used to modify how the trigger condition field of the instruction is interpreted. This can be helpful because the range of different hardware events and trigger conditions that may potentially be supported by the hardware may be greater than the number of bits available in the instruction encoding for encoding the trigger condition. To limit the size of the instruction encoding, a smaller trigger condition field can be used which has a number of bits which can be configured to represent different kinds of events or trigger conditions depending on the configuration information stored in the control register. The configuration information represents which subset of hardware-supported events/trigger conditions are able to be encoded by the trigger condition field. Hence, it will be appreciated that the trigger condition field of a triggered instruction need not be the only source of trigger condition information. A similar approach may be used for the trigger action field where configuration information stored in a control register may modify how the trigger action field is interpreted, so that the trigger action performed depends on the combination of the trigger condition field and configuration information in the control register. The configuration information used to interpret the trigger action field could be the same configuration information as used to interpret the trigger condition field, or alternatively different pieces of configuration information may independently set how the trigger action field and trigger condition field of a triggered instruction are to be interpreted.

For at least one encoding of the trigger condition information, the instruction issuing circuitry may determine whether the at least one trigger condition is satisfied by the machine state depending on at least one buffer status signal indicative of whether a given buffer structure of the plurality of buffer structures is full or empty. By providing the option to trigger issue of a given instruction in response to a buffer structure becoming full, software can control the triggered-instruction processing element so that a given computation instruction is not issued until there are a sufficient number of data items available to process, leaving instruction bandwidth available for processing other operations in cases where there is little data available to be processed. On the other hand, by providing support to allow software to configure the triggered-instruction processing element to defer issuing a given triggered instruction until a given buffer structure is empty, this can be useful so that the subsequent instructions to be processed after processing data from the buffer is not performed too early. Hence, by providing support for using, as part of the evaluation of trigger conditions for triggered instructions, buffer status signals maintained in hardware indicating whether a given buffer structure is full or empty, this helps avoid the need for software to include instructions for checking the status of a buffer, and therefore helps to increase the fraction of issued triggered instructions that can be used for real computations. Hence, this can help improve performance.

For at least one encoding of the trigger condition information, the instruction issuing circuitry may determine whether the at least one trigger condition is satisfied by the machine state depending on at least one input data availability condition indicating whether a tagged data item having a specified tag value is available on a specified input channel. Hence, the buffer structures to which tagged data can be allocated by the input data channel processing circuitry may not be the only way in which input data can be processed by triggered instructions. It is also possible for triggered instructions to be triggered based on input data availability directly, rather than based on buffer full/empty signals as discussed above. The choice of which approach to use can be left to the programmer or compiler of a particular program, who can set the trigger condition field of a particular triggered instruction accordingly (selecting either direct triggering based on receipt of input data on an input channel, or triggering based on buffer full status, say). In practice, the support for triggering off buffer full/empty status can be more efficient in hardware because it reduces the number of tag values of other non-buffered input data that has to be checked against trigger conditions for triggered instructions, but it is useful to also support direct triggering of instructions based on tagged data item availability to allow for processing of input data for which a buffer structure (queue based structure) may not be appropriate.

In one approach, in response to a determination that the given tagged data item specifies a tag value not mapped to any of the plurality of buffer structures, the input channel processing circuitry may make the given tagged data item available for checking of the at least one input data availability condition by the instruction issuing circuitry. For example, the given tagged data item can, in the case when not mapped to a buffer, be allocated to a holding storage area and the instruction issuing circuitry may check tag values of the tagged data items allocated to the holding area against the trigger conditions specified by the pool of triggered instructions to check whether any of those instructions has a trigger condition that depends on availability of a tagged data item having a specified tag value. Supporting the option of input channel data being processed without using one of the buffer structures mapped to the register storage can be useful because, in practice, the register storage may have a finite capacity and so the total number of buffers available may be limited, and because a buffer based access pattern (with head/tail pointers identifying the start/end of the queue) may not be appropriate for all data.

An input channel may be a physical signal path via which tagged data items may be input to a cluster of one or more triggered-instruction processing elements. Input channels may receive input data from a variety of different sources. For example, the input channel processing circuitry may receive the given tagged data item on the given input channel from at least one of:
  an on-chip communication interconnect;
  a memory access control unit associated with a cluster of one or more triggered-instruction processing elements that comprises a target triggered-instruction processing element which is to process the given tagged data item;
  another triggered-instruction processing element outside the cluster comprising the target triggered-instruction processing element which is to process the given tagged data item;
  a memory access control unit associated with another triggered-instruction processing element outside the cluster comprising the target triggered-instruction processing element which is to process the given tagged data item; and
  the target triggered-instruction processing element which is to process the given tagged data item.

The memory access control unit described in the examples above may be a dedicated block of circuitry used to control access to shared memory shared between two or more triggered-instruction processing elements. To increase compute density for the execution circuitry of the triggered-instruction processing elements, it can be useful to separate memory access operations into a separate block of circuitry. For example, a system on chip may comprise a network of "compute tiles" and "memory tiles" where the compute tiles comprise the execution circuitry and instruction issuing circuitry of a triggered-instruction processing element as mentioned above and the memory tiles comprise the "memory access control unit". There can be a one-to-one or a one-to-many relationship between memory tiles and compute tiles.

Although often an input channel to a given triggered-instruction processing element may receive its input data from other triggered-instruction processing elements or from shared memory via an on-chip communication interconnect, it is also possible to provide certain pairs or subsets of triggered-instruction processing elements which have a dedicated signal path via which data can be exchanged separate from the main on-chip communication interconnect connecting the overall set of triggered-instruction processing elements. Hence, in some cases the input channel may receive data via a path separate from the on-chip communication interconnect itself.

Also, in some cases a given input data channel for a given triggered-instruction processing element may receive its input data from the given triggered-instruction processing element itself. For example, an output data channel from the given triggered-instruction processing element may be coupled to an input data channel on the same triggered-instruction processing element. This can be useful, for example, if a buffer structure populated by data from one set of triggered instructions is to be processed by a different set of triggered instructions on the same processing element, so that the availability of the data on the output channel generated by the first set of triggered instructions can be used to evaluate the input-channel data availability or buffer availability conditions used to trigger the second set of triggered instructions. For example, this can be useful during decompression of weights for neural networks, where subsequent instructions may then process the decompressed weights.

In some examples, the input channel processing circuitry may be dedicated to a particular triggered-instruction processing element. Two or more different triggered-instruction processing elements may have their own respective instances of the input channel processing circuitry for processing input channel data received for that triggered-instruction processing element.

In other examples, the input channel processing circuitry may be shared between two or more triggered-instruction processing elements and may be capable of controlling enqueuing of the given tagged data item in a buffer structure mapped to register storage accessible to any of the two or more triggered-instruction processing elements. Sharing input channel processing circuitry between triggered-instruction processing elements can help to improve inter-processing element communication, as the shared buffer structure accessible to any of the cluster of two or more triggered-instruction processing elements can be used for exchanging data more efficiently than may be possible using the standard shared memory access mechanisms (as the buffer can be accessible to each processing element based on computation instructions specifying register specifiers mapped to the buffer, rather than load/store instructions specifying memory addresses).

The computation instruction, which is able to control the processing circuitry to perform a computation (e.g. arithmetic or logical) operation as well as access one of the buffer structures, may take various forms.

In some examples, in response to a dequeuing variant of the computation instruction, the execution circuitry may dequeue a data value from a dequeuing target buffer structure specified by the dequeuing variant of the computation instruction and perform a computation operation on the data value dequeued from the dequeuing target buffer structure. Hence, a single instruction can control the execution circuitry to both dequeue a data value from the buffer structure and perform a computation on the dequeued data value. This avoids the need for separate instructions for accessing the data in the buffer structure and performing the computation respectively, improving instruction throughput and performance.

Dequeuing a data value from the target buffer structure may comprise reading dequeued data from a register of the register storage identified as a tail entry of the target buffer structure by a tail pointer associated with the target buffer structure, and updating the tail pointer to identify a register representing a subsequent entry of the target buffer structure. Since the dequeued data value may be obtained from different registers of the register storage on different instances of executing the same dequeuing instruction, depending on the value of the tail pointer at the time when the instruction is executed, this means that there is no need for software to track which entry of the buffer is to be accessed on a given instance of the dequeuing instruction. This makes the software more efficient because there is no need for dedicated instructions for updating the tail pointer to track the point of the buffer to be accessed. The hardware may update the tail pointer for the target buffer structure in response to the dequeuing instruction without an explicit indication of the value to be set for the tail pointer next. The tail pointer can cycle through pointing at each buffer entry. Configuration information defining the start location, end location and/or size of the buffer can be used by the hardware to determine the point at which the tail pointer should wrap around between the start location and end location of the buffer.

The dequeuing instruction could be encoded in different ways. In one example, the dequeuing variant of the computation instruction is a computation instruction which specifies a source operand field with a value specifying a buffer dequeuing register corresponding to the dequeuing target buffer structure, the buffer dequeuing register being one of a set of one or more buffer dequeuing registers corresponding to one or more buffer structures. In response to the computation instruction when the operand field specifies a source register other than said set of one or more buffer dequeuing registers, the execution circuitry may obtain an operand data value from a source register (in local register storage of the corresponding triggered-instruction processing element) specified by the operand field and perform the computation operation on the operand data value obtained from the source register. By using the source operand field to indicate whether the computation instruction should behave as a dequeuing instruction which obtains, as the source operand, a data value dequeued from the buffer structure, or a standard computation instruction which obtains its source data from a register in the local register file (without a buffer dequeuing operation), this avoids any need to use another opcode value (different from the standard computation instruction's opcode value) to indicate the dequeuing instruction. This can be useful since the opcode space may have few spare encodings in the instruction architecture. A standard encoded computation instruction can therefore be repurposed as the dequeuing variant simply by specifying a different source register identifier.

When the source operand field specifies a given buffer dequeuing register, then the source operand is obtained in a dequeuing operation from a register that is identified based on the tail pointer for the corresponding buffer structure (which could be a register in the local register file of the processing element or in a separate register file to the local register file accessed for non-buffer register accesses), while when the source operand field does not specify any of the buffer dequeuing registers in the source operand is obtained in a non-dequeuing operation from a corresponding register in the processing element's local register file (in that case, the register accessed to obtain the data to be processed in the computation operation does not depend on the tail pointer). Note that in the case when the dequeuing instruction specifies the buffer dequeuing register, the data value to be read is actually obtained from a register other than the buffer dequeuing register. The buffer dequeuing register acts as a command interface used by the dequeuing instruction to flag that the source data should be obtained from a register depending on the tail pointer for the buffer associated with the buffer dequeuing register specified by the dequeuing instruction.

In practice, there is no need to provide any actual data storage associated with the buffer dequeuing register, as in some cases the functionality of controlling a dequeuing operation for a buffer based on access to the buffer dequeuing register may simply be based on control logic (implemented has hardware circuit logic) which detects when an instruction has a source register field identifying the buffer dequeuing register and in response to that generates control signals for obtaining the tail pointer of the corresponding buffer structure and using the tail pointer to identify which are the register of the register file should be read to obtain the source data for the computation operation.

In other examples, the buffer dequeuing register may have register storage similar to other registers, which could for example be used to store the head or tail pointers of the corresponding buffer structure.

In other examples of encoding the dequeuing variant of the computation instruction, the dequeuing variant may have a different opcode from the opcode used for a corresponding non-dequeuing variant of the compute instruction which performs the same computation operation as the dequeuing variant but applies the computation operation to a value from a register in a local register file of the processing element, which is accessed in a non-dequeuing manner (not based on any buffer tail pointer).

In some examples, the triggered instruction architecture may support the dequeuing variant of the computation instruction, but need not support any corresponding enqueuing variant for allowing software to trigger enqueuing of data onto a given buffer structure. In some examples, sole control over enqueuing of data into the buffer structures may be performed by the input channel processing circuitry in hardware and software may not be able to trigger enqueuing of data to one of the input channel buffers. Hence, allocation of data into a given buffer may be performed in hardware by the input channel processing circuitry, while consuming of buffer data from the buffer structure may be triggered by software by executing the dequeuing instruction. The register to which an enqueued item of data is to be written in a given buffer structure may be controlled based on a head pointer maintained by hardware for that buffer structure. Each time an enqueuing operation is performed, the head pointer may be updated to point to a register representing the next buffer entry.

Other examples may provide a triggered instruction architecture which, in addition to the dequeuing variant of the computation instruction, also supports an enqueuing variant of the computation instruction for allowing software to request that data value is enqueued in a particular target buffer structure. Hence, in response to an enqueuing variant of the computation instruction specifying an enqueuing target buffer structure, the execution circuitry performs a computation operation to generate a result value and enqueue the result value to the enqueuing target buffer structure. However, such an enqueuing instruction is not essential. Nevertheless, if supported an enqueuing instruction can be useful to allow software to insert arbitrary values into a specified buffer which have not necessarily been received on any particular input channel.

The enqueuing variant can be encoded using similar techniques to those discussed for the dequeuing variant, either using the destination register field of the computation instruction to indicate whether the output of the instruction should be a enqueued to a target buffer (if the destination register field specifies an enqueuing register corresponding to the target buffer) or should be written to a specified local register in a non-enqueuing manner (if the destination register field specifies a register other than the enqueuing registers corresponding to the implemented buffer structures). The enqueuing register for a given buffer structure could be the same register as the corresponding dequeuing register for that buffer structure mentioned above for the dequeuing instruction. In this case, a computation instruction that writes to (i.e. specifies in its destination register field) the enqueuing/dequeuing register for a given buffer structure is treated as an enqueuing instruction and a computation instruction that reads (i.e. specifies in its source register field) the enqueuing/dequeuing register for a given buffer structure is treated as a dequeuing instruction. The same computation instruction could behave as both an enqueuing instruction and the dequeuing instruction if both its source and destination register field specify enqueuing/dequeuing registers (either for the same buffer structure or for different buffer structures used for the source and destination of the computation operation). Alternatively, rather than using the destination register field to signal whether a computation instruction should also act as an enqueuing instruction, other architecture implementations may define separate opcodes for the non-enqueuing and enqueuing variants of a given computation instruction.

It will also be appreciated that, regardless of whether the register field or the opcode is used to distinguish the dequeuing/non-dequeuing or enqueuing/non-enqueuing variants of a computation instruction, there may be multiple kinds of computation instruction which can support dequeuing or enqueuing variants. For example, an add instruction could have at least non-dequeuing and dequeuing variants, a subtract instruction could have at least non-dequeuing and dequeuing variants, and so on. If multiple types of computation instruction are to be provided with dequeuing/enqueuing variants, it can be particularly useful to use the register fields to signal whether the computation instruction acts as the dequeuing/enqueuing variants, because this avoids a proliferation of additional opcodes needed for signalling the dequeuing/enqueuing variants of each type of computation instruction.

The input channel processing circuitry may comprise a plurality of input channel processing blocks supporting parallel processing of respective tagged data items so that the respective tagged data items are writable in parallel to respective locations of the plurality of buffer structures. For example, multiple write ports may be provided to allow writing to multiple registers of the register storage in the same cycle. This can help improve performance. In some cases, the input channel processing blocks may themselves comprise the register storage implementing the corresponding buffer structures to which that input channel processing block can enqueue data mapped to those buffer structures.

The input channel processing circuitry may select the selected buffer structure based on the tag value and the given input channel associated with the given tagged data item, so that tagged data items specifying the same tag value received on different input channels are allocatable to different buffer structures. This can allow for specific selection of buffers for each input channel/tag value combination. Nevertheless, it is also possible to specify the same buffer for more than one combination of input channel/tag value. The selection of how to map channel/tag combinations onto specific buffers can be controlled by software by setting configuration information defining the mappings applied by the input channel processing circuitry.

In some examples, the input channel processing circuitry comprises lookup circuitry to look up the tag value of the given tagged data item in a lookup table corresponding to the given input channel, the lookup table mapping the tag value to an indication of at least one corresponding buffer structure. This indication could, for example, be a buffer ID or an address of a register which acts as a command interface for triggering enqueuing of data into the corresponding buffer data structure (e.g. that register may be associated with a head pointer identifying the register to which the next enqueued item should be written). Lookup tables can be defined per input channel or could be shared between two or more input channels. The lookup tables can be configurable by software executing on the triggered-instruction processing elements themselves or by another processing element other than the triggered-instruction processing elements (e.g. if the triggered-instruction processing elements form part of a hardware accelerator in a processing system also including at least one PC-based processing element such as a central processing unit (CPU), the mapping data in the lookup data could be configurable by software executing on the PC-based processing element).

The input channel processing circuitry may use the indication of the at least one corresponding buffer structure provided by the lookup table to select a storage location to be read to provide at least one of:

a processing element identifier identifying a target triggered-instruction processing element at which the at least one corresponding buffer structure is mapped onto register storage of that triggered-instruction processing element (this can be useful in implementations where the input channel processing circuitry is shared between two or more triggered-instruction processing elements);

an input channel processing block identifier identifying one of a plurality of input channel processing blocks for controlling enqueuing of data onto respective sets of buffer structures;

a buffer structure identifier distinguishing two or more buffer structures mapped onto register storage of the target triggered-instruction processing element; and a head pointer indicating a register of the target triggered-instruction processing element to which the data value of the given tagged data item is to be written.

In some examples, the lookup table may map a particular tag value for a particular input data channel to a single indication of a corresponding buffer structure.

However, it is also possible for the lookup table to have fields for mapping the tag value to indications of a plurality of corresponding buffer structures in which the data item specifying the tag value is capable of being enqueued. This can be useful to enable greater flexibility in which buffer is allocated with the data for a given input data channel/tag value pair.

For example, for some implementations, when the lookup table specifies that the tag value maps to two or more corresponding buffer structures, the input channel processing circuitry may select, based on buffer status signals indicative of which of the two or more corresponding buffer structures are full, a selected available buffer structure which is not full from among the two or more corresponding buffer structures, and control enqueuing of the data value of the given tagged data item in the selected available buffer structure. Hence, the support for multiple buffers mapped to the same input data channel/tag value pair can help to distribute load across multiple buffers, improving performance by reducing the chance that receipt of input channel data is stalled because all the available buffers for buffering data for a given input data channel/tag value pair are full.

For some implementations, when the lookup table specifies that the tag value maps to two or more corresponding buffer structures, the input channel processing circuitry may control enqueuing of the data value of the given tagged data item in each of said two or more corresponding buffer structures. This enables a multicast function where the same data can be enqueued into multiple buffer structures. This can be useful in implementations which require processing of the same data in a number of different ways (e.g. using different operations applied to the same data, or combining the same data for a first operand with different values for a second operand—this can be particularly useful for convolutional neural network processing, for example), or where multiple processing elements need to process the same data.

In implementations which support mapping the tag value to more than one corresponding buffer structure, some implementations may support only the first approach of alternatively enqueuing the data value with that tag value to a single one of those buffer structures, when multiple valid buffers are defined for a single input data channel/tag value pair. Other implementations may support only the second approach of multicasting the tag value to each of multiple buffer structures, when multiple valid buffers are defined for a single input data channel/tag value pair. Other implementations may support both the first and second approaches, with control data specified in the mapping table to indicate whether, if there are multiple valid buffers for the same input data channel/tag value pair, the data with that tag value received on that input data channel should be allocated to any one available buffer of those buffers, or multicast to each of the valid buffers.

In some examples, the only instructions supported by the triggered instruction architecture for accessing a given buffer (used for enqueuing/dequeuing of input channel data based on the head/tail pointers of the buffer) may be the enqueuing/dequeuing variants of the computation instruction described above which also update the head/tail pointers to advance to the next item in the buffer.

However, other examples of the triggered instruction architecture may also support at least one instruction for controlling the execution circuitry to make a random-access read/write to an entry of a given buffer structure, without updating the head pointer (for a write to the buffer) or the tail pointer (for a read to the buffer). For example, a non-dequeuing buffer read instruction, or a non-enqueuing buffer write instruction, could be supported to allow random access to a specified entry of the buffer without updating the head/tail pointers. Such instructions could identify the location of the buffer to be read/written either using an offset relative to the start location of the buffer representing the start of the region of the register file used for that buffer, or using an offset relative to the location indicated by the head or tail pointer, or using an absolute register address of the register file identifying the register to be read/written.

The register storage used for the buffer structures used by the input channel processing circuitry to enqueue input data received on the input channels can be either: (i) local register storage of said at least one of the triggered-instruction processing elements, which is also accessible in response to an instruction triggering a register access other than an access to one of said plurality of buffer structures, or (ii) register storage separate from local register storage of said at least one of the triggered-instruction processing elements accessible in response to an instruction triggering a register access other than an access to one of said plurality of buffer structures. In the second case, the separate register storage could for example be register storage implemented within the input channel processing circuitry or within the memory access control unit associated with a cluster of one or more triggered-instruction processing element for which enqueuing of input data is controlled by the input channel processing circuitry.

The buffers used for enqueuing/dequeuing of input data received on input channels may not be the only types of hardware buffers accessible to a given triggered-instruction processing element based on register identifiers. There could also be some local hardware buffers mapped onto the local register file of the triggered-instruction processing element, which can be arbitrarily enqueued/dequeued with data that has not been received on an input channel, under control of corresponding local buffer enqueuing/dequeuing instructions similar to those used for enqueuing/dequeuing of input channel data as described above. In some cases, the enqueuing/dequeuing instructions used to enqueue/dequeue from local buffers may be encoded in the same way as those enqueuing/dequeuing instructions used to enqueue/dequeue from the input data buffers, other than specifying a different enqueuing/dequeuing register in the instruction's destination/source register field to identify whether the buffer from which data is to be enqueued or dequeued is one of the local buffer structures (not used by the input channel processing circuitry for enqueuing of data received on an input channel) or one of the input data buffer structures (used by the input channel processing circuitry for enqueuing of data received on an input channel).

FIG. 1 schematically illustrates a data processing apparatus 10 arranged as a spatial architecture according to various examples of the present techniques. Spatial architectures can accelerate some applications by unrolling or unfolding the computations, which form the most time-consuming portion of program execution, in space rather than in time. Computations are unrolled in space by using a plurality of hardware units capable of concurrent operation. In addition to taking advantage of the concurrency opportunities offered by disaggregated applications which have been spread out on a chip, spatial architectures, such as data processing apparatus 10, also take advantage of distributed on-chip memories. In this way, each processing element is associated with one or more memory blocks in close proximity to it. As a result, spatial architectures can circumvent the von-Neumann bottleneck which hinders performance of many traditional architectures.

The data processing apparatus 10 comprises an array of processing elements (compute/memory access clusters) connected via an on-chip communication interconnect, such as a network on chip. The network is connected to a cache hierarchy or main memory via interface nodes, which are otherwise referred to as interface tiles (ITs) and are connected to the network via multiplexers (X). Each processing element comprises one or more compute tiles (CTs) and a memory tile (MTs). While FIG. 1 shows a 1:1 mapping between CTs and MTs, other examples could share a MT between more than one CT. The CTs perform the bulk of the data processing operations and arithmetic computations performed by a given processing element (PE). The MTs act as memory access control circuitry and have the role of performing data accesses to locally connected memory (local storage circuitry) and data transfers to/from the more remote regions of memory and inter-processing element memory transfers between the processing element and other processing elements.

In some example configurations each of the PEs comprises local storage circuitry connected to each memory control circuit (MT) and each memory control circuitry (MT) has direct connections to one processing circuit (CT). Each PE is connected to a network-on-chip which is used to transfer data between memory control circuits (MTs) and between each memory control circuit (MT) and the interface node (IT).

In alternative configurations local storage circuitry is provided between plural processing elements and is accessible by multiple memory control circuits (MTs). Alternatively, a single MT can be shared between plural CTs.

The processing circuitry formed by the respective compute/memory access clusters (CTs/MTs) shown in FIG. 1 may, for example, be used as a hardware accelerator used to accelerate certain processing tasks, such as machine learning processing (e.g. neural network processing), encryption, etc. The ITs may be used to communicate with other portions of a system on chip (not shown in FIG. 1), such as memory storage and other types of processing unit (e.g. central processing unit (CPU) or graphics processing unit (GPU). Configuration of control data used to control the operation of the CTs/MTs may be performed by software executing on a CPU or other processing unit of the system.

The CTs (or the cluster of CTs and MTs as a whole) can be seen as triggered-instruction processing elements, which execute instructions according to a triggered instruction architecture, rather than a program-counter-based architecture.

In a conventional program-counter-based architecture, a program counter is used to track sequential stepping of program flow through a program according to a predefined order defined by the programmer or compiler (other than at branch points marked by branch instructions). The correct sequence through the program is sequential other than that the branch points. At a branch point there are only two options for the next step in the program flow (taken or not-taken). Although a processor implementation may use techniques such as out of order processing and speculation to execute instructions in a different order from the program order, the results generated must be consistent with the results that would have been generated if the instructions were executed in program order.

In contrast, for a triggered instruction architecture, a number of triggered instructions are defined by the programmer or compiler which have no predefined order in which they are supposed to be executed. Instead, each triggered instruction specifies the trigger conditions to be satisfied by the machine state of the processing element for that instruction to validly be issued for execution. In a given cycle of determining the next instruction to issue, a triggered-instruction processing element can monitor multiple triggered instructions in the same cycle to check whether their trigger conditions are satisfied (rather than examining, at most, the conditions for taking or not-taking a single branch instruction in order to determine the next instruction to be executed after the branch, as in a program-counter based architecture).

It is possible for a triggered-instruction processing element to use speculation to predict which instructions will satisfy their respective trigger conditions, so that instructions can be issued before the trigger conditions are actually satisfied. This helps allow a processing pipeline to be more fully utilised (compared to the case in the absence of speculation, when the processing element waits for a given instruction to update the machine state before evaluating whether the machine state satisfies trigger conditions for another instruction). Such speculation can help to improve performance. However, even if speculation is used so that instructions are issued for execution before their trigger conditions are actually satisfied, the end result should be consistent with the result that would have been achieved if the update to machine state by one instruction was made before evaluating the trigger conditions for selecting the next instruction to be issued for execution. Hence, if the speculation was incorrect and an instruction was issued for execution but it is determined later that the trigger conditions for that instruction were not satisfied, then a recovery operation may be performed to flush results which could be incorrect and resume execution from a correct point prior to the mis-speculation.

Figure 2:
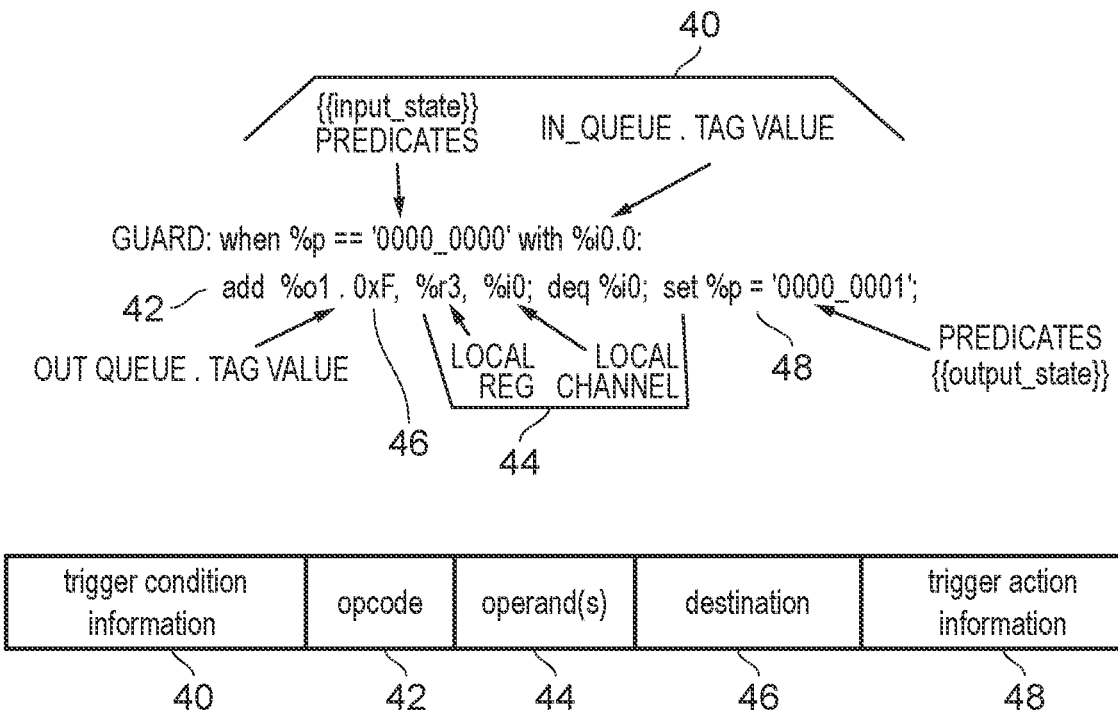
FIG. 2 illustrates an example of a triggered instruction.

FIG. 2 illustrates an example of a triggered instruction. The lower part of FIG. 2 illustrates an example of fields of an instruction encoding, while the upper part of FIG. 2 shows information specified (in high level code representation) for an example of a triggered instruction by a programmer/compiler. The triggered instruction specifies:

trigger condition information 40 indicating one or more trigger conditions which are to be satisfied by machine state of the processing element for the instruction to be validly issued for execution.

an opcode 42 identifying the type of processing operation to be performed in response to the instruction (e.g. add in the high-level code example of FIG. 2).

one or more operands 44 for the processing operation;

a destination location 46 to which the result of the processing operation is to be output; and trigger action information 48 indicating one or more updates to machine state of the processing element to be made in response to the execution of the triggered instruction.

It will be appreciated that while the fields of the instructions are shown in a particular order in FIG. 2, other implementations could order the fields differently. Also, information shown as a single field in the encoding of FIG. 2 could be split between two or more discontiguous sets of bits within the instruction encoding.

In this example, the trigger condition information includes predicate information and input channel availability information. The predicate information and input channel availability information could be encoded separately in the trigger condition information, or represented by a common encoding.

The predicate information specifies one or more events which are to occur for the instruction to be validly issued. Although other encodings of the predicate information are also possible (e.g. with each value of the predicate information representing a certain combination of events that are to occur, not necessarily with each event represented by a separate bit in the encoding), a relatively simple encoding can be for each bit of the predicate indication to correspond to a different event and indicate whether that event is required to have occurred for the instruction to be validly issued for execution. Hence, if multiple bits are set, the trigger conditions requires each of those events to occur for the instruction to be issued. An "event" represented by the predicate information could, for example, be any of:

occurrence of a hardware-signalled event (e.g. a reset, an interrupt, a memory fault, or an error signal being asserted).

a buffer full/empty event caused by one of the buffer structures described below becoming full or empty.

a software-defined event which has no particular hardware-defined meaning. Software can use such predicate bits to impose ordering restrictions on instructions. For example, if a first instruction should not be executed until a second instruction has executed, the second instruction can specify (in its trigger action information 48) that a selected predicate bit should be set in response to the second instruction, and the first instruction can specify (in its trigger condition information 40) that the selected predicate bit should be set in order for the first instruction to validly be issued for execution.

The meaning of particular predicate bits may also depend on control state stored in a configuration register, which affects the interpretation of the predicate bits. For example, FIG. 2 shows an 8-bit predicate field which allows for 256 different combinations of events to be encoded (e.g. a combination of 8 different events in any independent combination of ON/OFF settings for each event if a bit per event is allocated, or 256 more arbitrary combinations of events if the encoding does not allocate a separate bit per event). The configuration register may store control which sets of events are represented by each encoding, selecting events from a larger set of events supported in hardware.

The trigger action information 48 can be defined using output predicates in a corresponding way to the input predicates defined for the trigger condition information 40.

Figure 3:
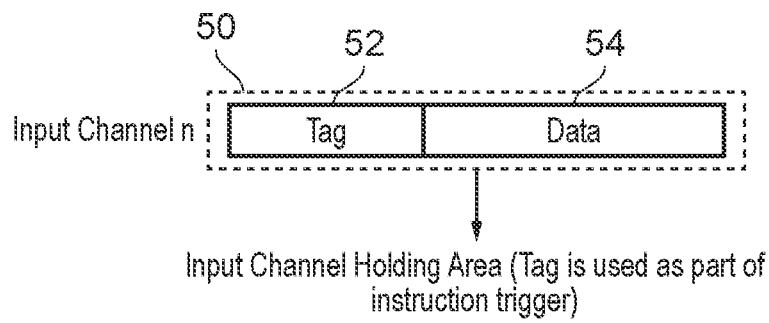
FIG. 3 illustrates an example of a tagged data item received on an input channel.

A given triggered-instruction processing element (CT) may receive input data from a number of input channels, where each input channel may be a physical signal path receiving input data from a particular source. The source of the input data could be, for example, the memory tile MT associated with that CT or a MT shared between a cluster of CTs including the given CT, or could be the on-chip network linking with other sets of CTs, or could be a dedicated signal path (separate from the main network on chip between CTs) between a particular pair of CTs or cluster of CTs. As shown in FIG. 3, a given input channel n receives tagged data items 50 comprising a tag value 52 and data value 54. The tag value 52 is an identifier used to identify the purpose of the data and can be used by the triggered-instruction processing element (CT) to control the triggering of triggered instructions.

Hence, as shown in FIG. 2, the trigger condition information 40 could also include an input data availability condition which indicates that valid issue of the instruction also depends on availability of input data on a particular input data channel. For example, the high level instruction shown at the top of FIG. 2 indicates in its trigger conditions an identifier "% i0.0" signifying that valid issue requires availability of input data having a particular tag value "0" on a particular input channel (% i0). Of course, the indication "% i0.0" is just an example representation of this information at a high level and it will be appreciated that, in the instruction encoding itself, the trigger condition information 40 may encode in other ways the fact that triggering of the instruction depends on input data availability of data having a specified tag value on a specified input channel. It is not essential to always specify a particular tag value required to be seen in order for the trigger conditions to be satisfied. The triggered instruction architecture may also support the ability for the instruction to be triggered based on availability of input data (with any tag value) on a specified input channel.

The operands 44 for the triggered instruction can be specified in different ways. While FIG. 2 shows an instruction having two operands, other instructions may have fewer operands or a greater number of operands. An operand can be identified as being stored in a register addressable using the local register address space of the triggered-instruction processing element (CT). See for example the operand identified using the identifier "% r3" in FIG. 2, indicating that the operand is to be taken from register number 3. Also, an operand can be identified as being the data value taken from a particular input channel, such as input channel "% i0" as shown in FIG. 2. Again, while FIG. 2 shows the generic case where any data from input channel % i0 may be processed by the instruction, it may also be possible to specify that data having a particular tag value should be used as the operand (e.g. the operand could be specified as % i0.0x5, indicating that the operand is the data value having tag 0x5 on input channel 25% i0).

Similarly, the destination location 46 for the instruction could be either a register in the CT's local register address space or (as in the example of FIG. 2) an indication of an output data channel onto which the result of the instruction should be output. The output data channel may be a signal path passing data to the same CT or another CT, or to the CT's or other CT's MT, or to the network on chip. The destination location 46 can identify a tag value to be specified in the tagged data item 50 to be output on the output channel. For example, the instruction in FIG. 2 is specifying that a data value tagged with tag value 0xF should be output on output channel % o1.

Figure 4:
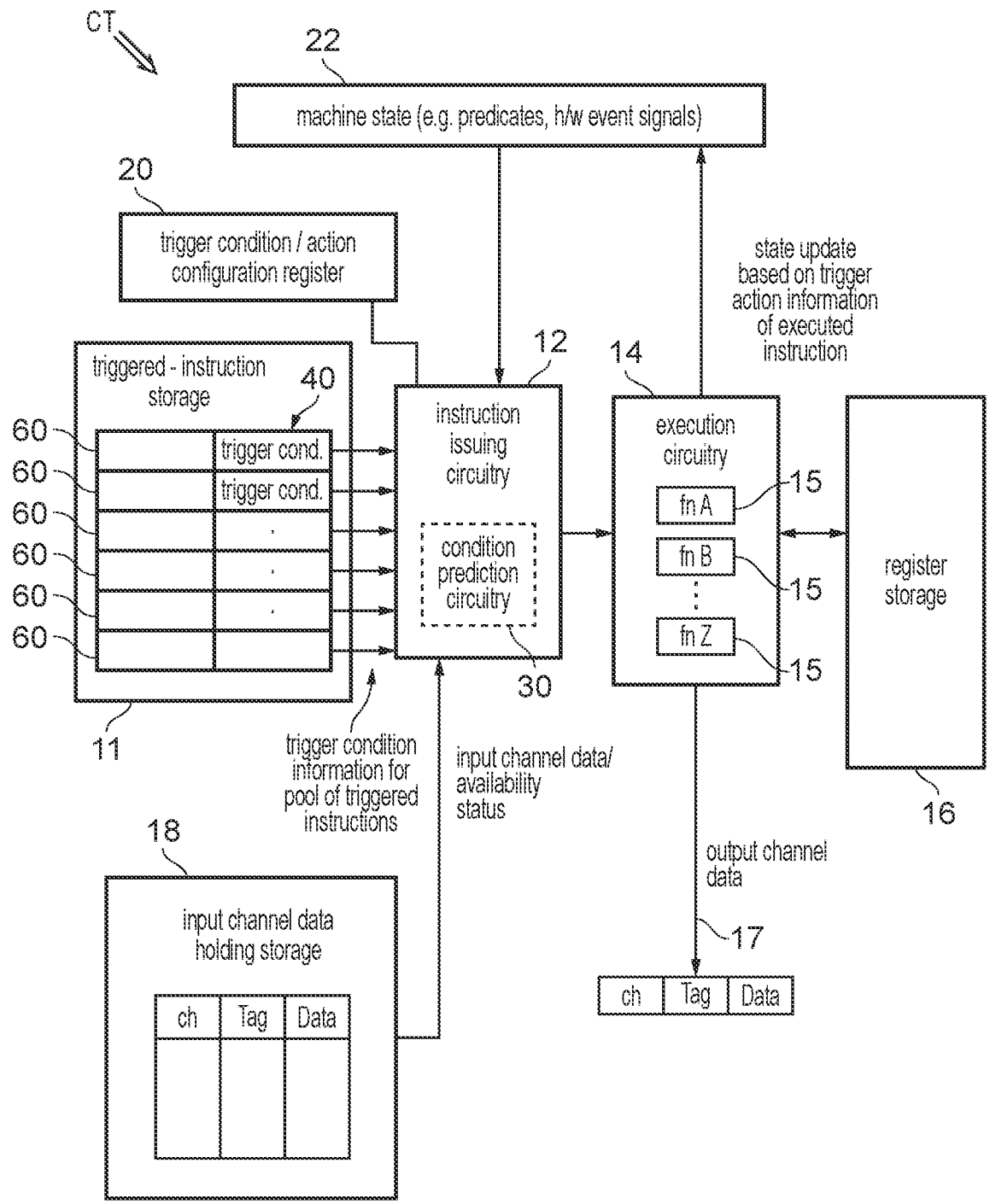
FIG. 4 illustrates an example of circuitry of a given triggered-instruction processing element.

FIG. 4 illustrates an example of circuitry included in a given triggered-instruction processing element (in particular, the CT of the processing element) for processing triggered instructions. Triggered-instruction storage circuitry 11 includes a number of storage locations 60 for storing respective triggered-instructions. The trigger condition information 40 of those instructions is made available to instruction issuing circuitry 12 which analyses whether the trigger conditions 40 for the pool of triggered instructions are determined to be satisfied by the machine state 22 (and, if applicable for a given instruction, also determines whether the trigger conditions are satisfied based on input channel data availability status of input channel data which has been received from input channels and is being held in input channel data holding storage 18). The machine state 22 used to evaluate trigger conditions may include hardware event signals indicating whether various hardware events have occurred, as well as predicate indications set based on trigger actions from previous triggered instructions as discussed earlier. Interpretation of the predicates may depend on configuration information stored in a trigger condition/action configuration register 20.

Some examples may support speculative issue of triggered instructions, in which case the instruction checking circuitry 12 includes condition prediction circuitry 30 for predicting whether the trigger conditions for a given triggered instruction will be satisfied. The prediction can be based on prediction state maintained based on outcomes of previous attempts at executing the instructions (e.g. the prediction state may correlate an earlier event or identification of an earlier instruction with an identification of a later set of one or more instructions expected to be executed some time after the earlier event or instruction). If the prediction is incorrect and an instruction is incorrectly issued despite its trigger conditions not turning out to be satisfied, then the effects of the instruction can be reversed (e.g. by flushing the pipeline and resuming processing from a previous correct point of execution).

If multiple ready-to-issue triggered instructions are available, which each are determined or predicted to have their trigger conditions satisfied in the same cycle of selecting a next instruction to issue, the instruction issuing circuitry 12 selects between the ready-to-issue triggered instructions based on a predefined priority order. For example, the priority order may be in a predetermined sequence of the storage locations 60 for the triggered-instruction storage circuitry 11 (with the instructions being allocated to those storage locations 60 in an order corresponding to the order in which the instructions appear in the memory address space from which those instructions are fetched—hence the programmer or compiler may influence the priority order by defining the order in which the instructions appear in memory). Alternatively, explicit priority indications may be assigned to each instruction to indicate their relative priority.

When a triggered instruction is selected for issue, it is sent to the execution circuitry 14 of the processing element (CT), which comprises a number of execution units 15 for executing instructions of different types of classes. For example, execution units 15 could include an adder to perform addition/subtraction operations, a multiplier to perform multiplication operations, etc. Operands for a given operation performed by the execution circuitry 14 can be derived either from input channel data from the input channel data holding storage 18, or from register data read from local register storage 16 of the processing element (or, as mentioned below from further register storage in an input processing block which is accessible based on a register address in the register address space used to access the local register storage 16). The result of a given operation performed by the execution circuitry can be output either as output channel data 17 to be output over a given output channel (to the same CT or other CTs, those CTs' associated MTs, or the network on chip) or could be written to a destination register of the local register storage 16 (or to the register storage in the input processing block). In addition to outputting the computational result of the executed instruction, the execution circuitry 14 also updates the machine state 22 based on any trigger action specified by the trigger action information 48 of the executed instruction (e.g. one or more predicate bits may be set or cleared as specified by the trigger action information 48).

Hence, since a triggered instruction specifies the conditions required for its own valid processing and can also perform a computation operation in addition to setting the predicates for controlling subsequent program flow, there is no need for dedicated branch instructions which only control program flow but do not carry out a corresponding computation operation. This helps to increase the compute density (amount of computational workloads achieved per instruction) and hence can improve performance.

Triggered spatial processing elements (PEs) typically have several input (and output) channels where packets of data are fed into it (and fed out of it). The input packets comprise tagged data values 50 having a tag 52 and data 54 as shown in FIG. 3. The tag changes the system conditions, represented as predicate bits, and can therefore result in a specific instruction being triggered, based on the value of the tag. An advantage of the triggered instruction paradigm is how it reacts to incoming data streams efficiently, based on data availability.

However, a key constraint in triggered instruction architectures is the number of instructions that can be stored in the triggered-instruction storage 11 of each PE. The checking of trigger conditions for each triggered instruction in the pool of instructions stored in triggered-instruction storage 11 limits how many instructions can feasibly be stored in a given PE. The technique discussed in this application enables hardware to be configured to manage input channels, reducing the number of instructions required for handling input transactions, thus enabling more instructions to be used for useful work, and reducing the number of operations, hence improving performance. Specifically, the additional hardware enables input channel data to be enqueued into buffers (which provide full/empty trigger events that can trigger instructions, and which can be dequeued by software) mapped onto the local register file of a PE. As different tag values from the same input channel can be allocated to different buffers, the problem of blocking of an input channel due to insufficient space in a buffer can be mitigated without needing complex routing protocols on the network on chip, since a blocked buffer for one tag value does not necessarily block processing of data values with other tag values.

Figure 5:
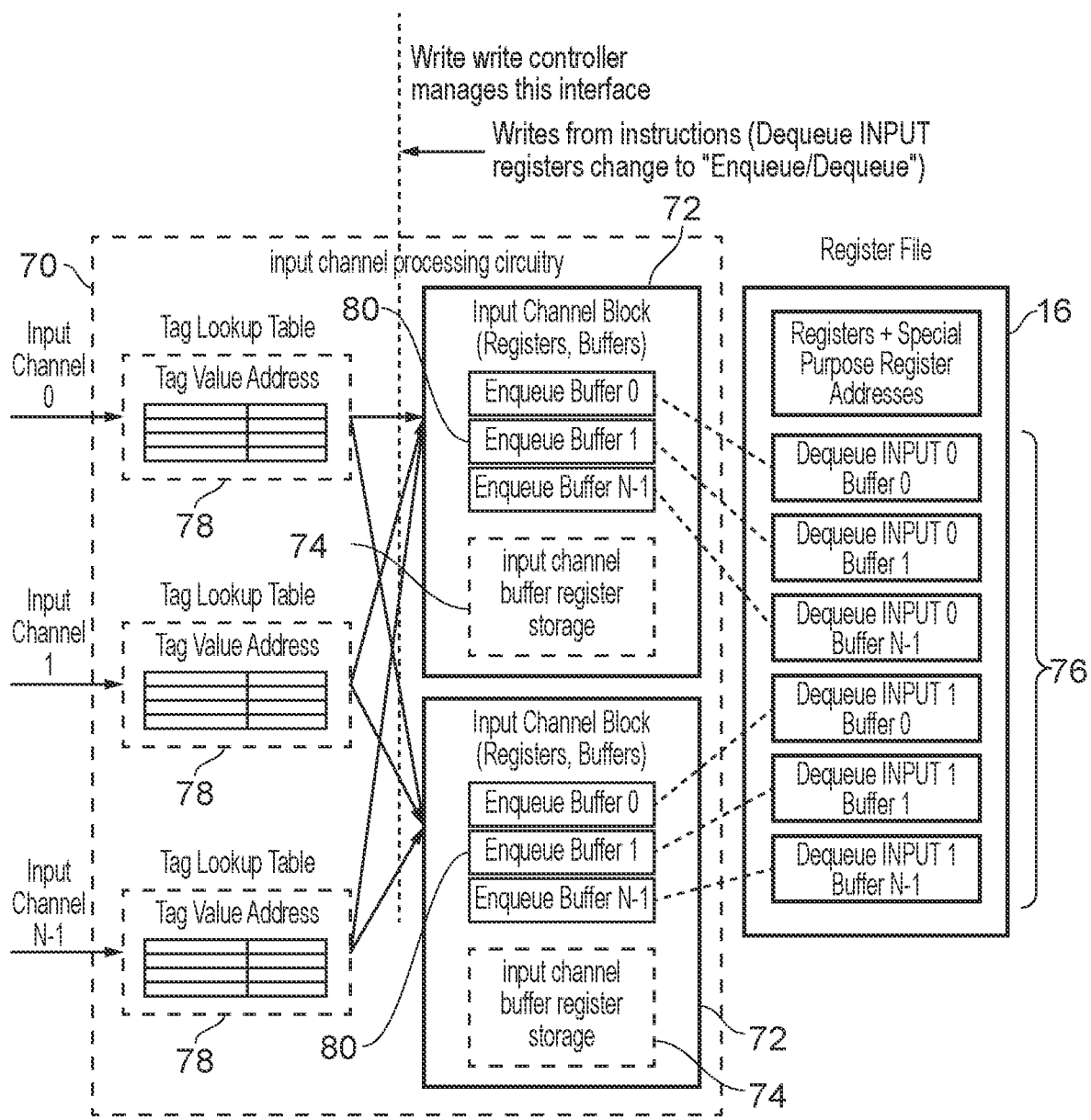
FIG. 5 illustrates a first example of input channel processing circuitry.

As shown in FIG. 5, a given PE is provided with input channel processing circuitry 70 which comprises one or more input blocks 72 for providing the hardware buffer structures accessible to the PE for access of input data received on input channels. There could be one or more Input Blocks for each PE. FIG. 5 shows two input blocks 72, but other examples could provide only one or could provide more than two. Having multiple input blocks 72 can be useful as each input block may have separate register read/write ports to allow parallel buffer reads/writes under control of the respective input blocks. However, other examples may provide only a single input block 72.

An input block 72 provides a set of registers 74 that can be used in a number of configurable buffers. In some examples, the buffers are writable from the input channel hardware 70 handling the tag lookup tables for mapping received input data onto the buffers, but are not writable by the instructions executing on the PE. However, instructions executing on the PE can dequeue the buffers of the input blocks, by executing instructions specifying register specifier corresponding to one of a set of dequeuing registers 76 used to control dequeuing of data from a corresponding buffer.

The tag 52 of a received packet 50 on the input channels is looked up in a lookup table 78 (configured by software) and a register write is generated to write the received data value 54 to a register having a corresponding address identified for the tag 52 in the lookup table 78. That address corresponds to one of a set of enqueue buffer registers 80 of the input blocks 72. A write to a given enqueue buffer register 80 by the input channel processing circuitry 70 triggers the input block 72 to look up the head pointer of the buffer structure corresponding to the given enqueue buffer register 80, and write the received data value to a register in the register storage 74 that corresponds to the head pointer. The input block 72 also updates the head pointer to point to the next location of the buffer (wrapping around to the start of the buffer if the end of the buffer has been reached—configuration information in registers of the input channel block 72 may specify the start/end of the buffer or a size of the buffer, to help identify the wraparound point). If the tag lookup does not find a match against any value in the lookup table, the corresponding tag/data pair is put into the input channel data holding area 18 of the PE and the tag can be directly used to trigger instructions as described earlier for FIG. 4.

Instructions can be triggered from the hardware events, such as "full" or "empty", associated with the buffers into which the input data is automatically enqueued into.

To access the buffers, the software instructions executed by the PE may see a register address space as shown in FIG.

Figure 6:
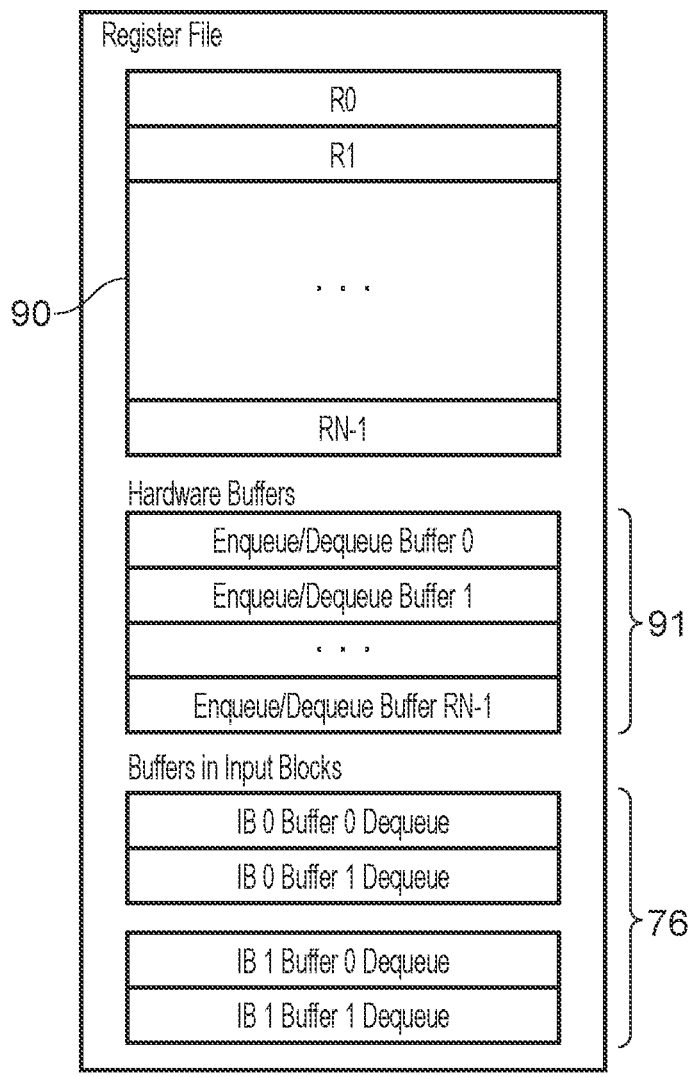
FIG. 6 illustrates an example of a register address space accessible to a triggered-instruction processing element based on register specifiers of instructions.

6. The local registers of the PE's local register file 16 are accessible using a set of general purpose register specifiers 90. The input data buffers in the input blocks 72 are accessible using a set of dequeue register specifiers 76 as described earlier. Hence, when a triggered computation instruction specifies a register specifier corresponding to one of the buffer dequeue registers 76, the computation instruction is applied to a source operand dequeued from the corresponding input buffer in the input channel blocks 72, while when the instruction specifies one of the general purpose register specifiers 90 then a standard register read to the local register file 16 is performed to obtain the corresponding operand for the computation. As shown in FIG. 6, the register address space could also include further enqueue/dequeue registers 91 for enqueuing of dequeuing data in local buffer structures mapped in hardware to the local register file 16 of the PE, which can be used for arbitrary software-selected data not necessarily received on an input channel.

A dequeuing read from a given dequeue register 76 triggers lookup of a tail pointer for the corresponding buffer, which tracks the entry of the buffer which is next in the queue to be read. The dequeue operation also causes the tail pointer to be updated to point to the next entry in the queue (with wrap around if necessary if the tail pointer has reached the end of the buffer).

Hardware manages the updates to the head/tail pointers and so there is no need for explicit software intervention for updating the head/tail pointers.

Hence, in this setup, the input channels have a small address space containing locations that it can write to, using addresses from a pre-configured lookup table, which causes an enqueue into a particular buffer/custom hardware unit. In the simplest form, the instruction can read an address of a dequeue register 76 (for simplicity, we consider these addresses to be 'inside' the core's RF address space). Since multiple write ports increase the hardware complexity of these blocks, multiple input blocks 72 (each with a single write port) can be instantiated. If it expected that all input channels would be active all the time, then it may make sense to have one block per input channel, though usually it would be less and input blocks 72 may be shared among multiple input channels. A lookup table 78 may be provided per input channel to allow channel specific mappings of tag values to buffer IDs, although it is also possible to share a lookup table 78 between input channels (with the input channel ID being part of the looked up information alongside the tag).

It may also be desired to allow the instructions to write into buffers within any of these input blocks, in which case the previously mentioned Dequeue registers 76 in the register file address space become Dequeue/Enqueue registers that can also be written to.

In practice, there may usually be fewer of these input blocks 72 than input channels and may be smaller (have fewer registers) than the local register file block 16 within a PE. They could be of different sizes and be heterogenous (e.g. they may be of different sizes, with varying numbers of physical buffers available).

Figure 7:
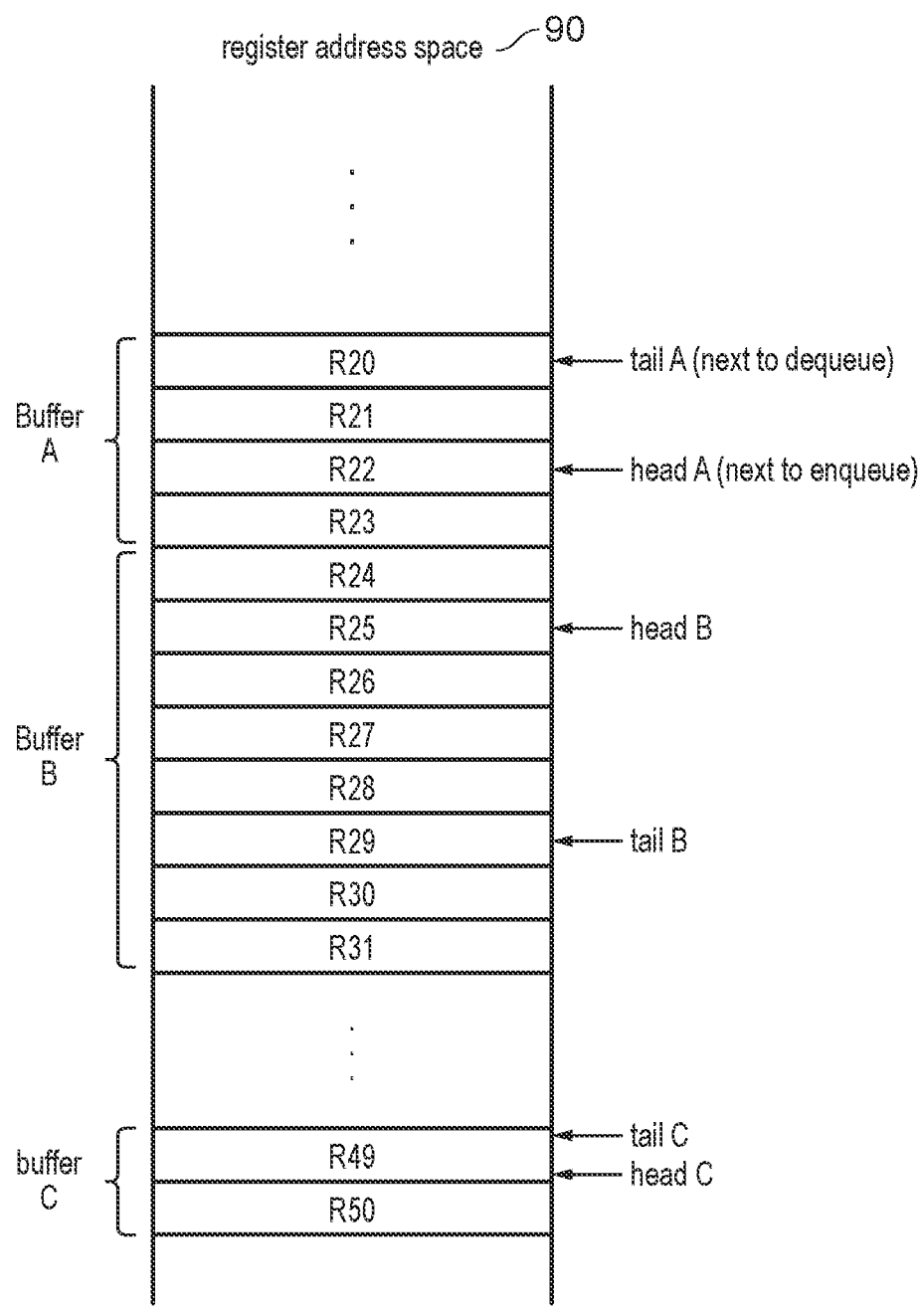
FIG. 7 illustrates an example of mapping buffer structures for processing input channel data onto register storage.

In the example shown above, the input channel buffers are mapped to register storage 74 within the input channel processing circuitry 70 which is accessible based on a computation instruction executed by a PE (so does not need a separate load/store instruction to access the buffer). However, it is also possible for the input channel processing circuitry 70 to write the received input channel data to buffer structures mapped to the local register file 16 of the PE. As shown in FIG. 7, configuration data may be defined to specify start/end points (or one of the start/end points and a buffer size) for a number of buffers A, B, C, which can then be mapped to particular register address ranges within the general purpose register address space 90 (e.g. in this instance, registers R20-R23 for buffer A, registers R24-R31 for buffer B and registers R49-R50 for buffer C). Hence, it is not essential for the register storage used for the input channel buffers to be within the input channel processing circuitry 70—the buffers could also be implemented in local registers of the PE.

Figure 8:
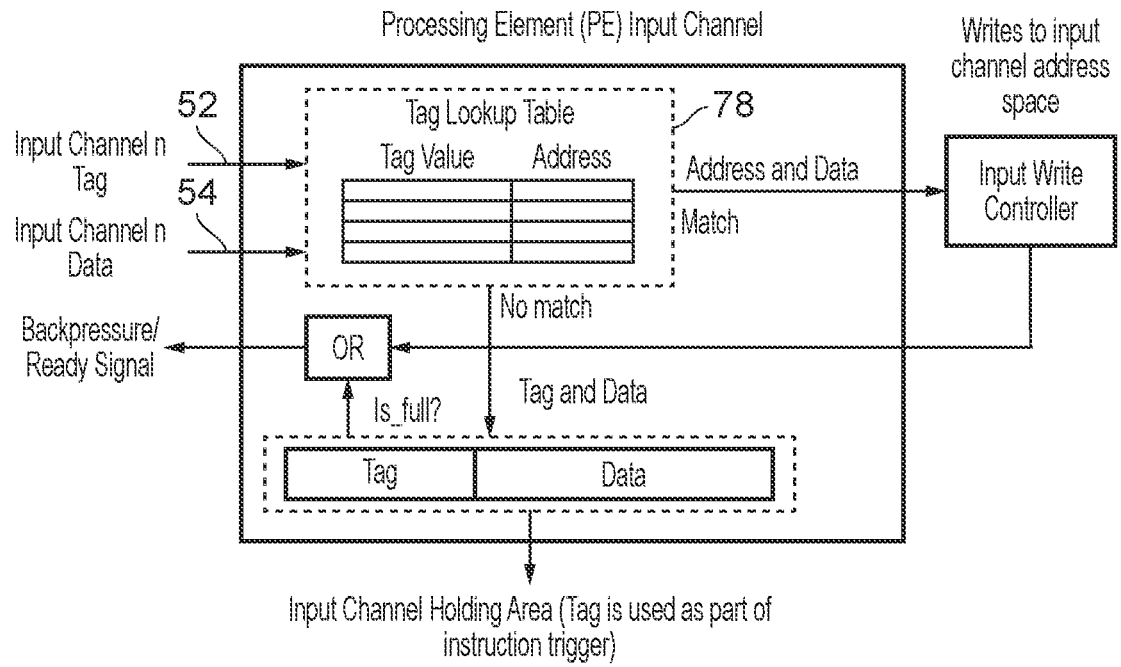
FIGS. 8 and 9 show alternative implementations for a tag lookup table used by the input channel processing circuitry.

Any of the input channels can have its data written to any of the buffers managed by any of the input channel blocks 72. This is achieved by assigning an address to each of the enqueue buffers. As shown in FIG. 8, when an input packet comes in to one of the input channels (consisting of a tag 52 and data 54), the tag value gets looked up in a tag-address lookup table. If a tag in the table matches, then the data gets written to the corresponding address in one of the input channel blocks, and the tag is discarded. The write to the corresponding address for a given buffer triggers the input channel block 72 to lookup the corresponding head pointer for the buffer, and write the data 54 to the register identified by the head pointer. As mentioned earlier, if the tag does not match in the lookup table 78, the tag and data are sent to the input channel data holding storage 18 of a corresponding PE.

Figure 9:
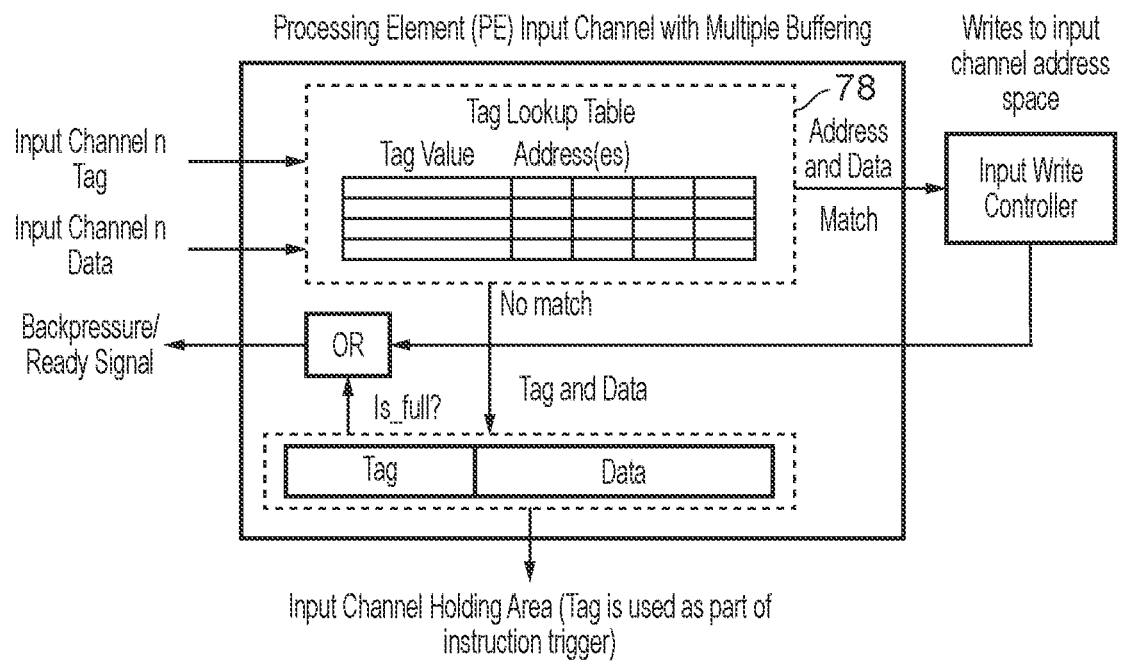

This can be extended to enable hardware multiple buffering (e.g. double buffering). As shown in FIG. 9, the tag lookup table 78 can be altered so that instead of each tag mapping to a single address, it maps to multiple addresses (FIG. 5). If a tag matches, a write to the first valid address is attempted. If the full event signal of the corresponding buffer is TRUE (indicating the buffer is full), then the input block 72 attempts to write to the next valid address specified in the lookup table 78 for the looked up tag value 52.

Other embodiments may enable multicast transfers where a single data packet is capable of being written to multiple buffers simultaneously if there are multiple valid addresses associated with a single tag by the lookup table 78. In a system where both multi-buffering and multi-cast are to be supported, a single bit flag could be set in the tag lookup table 78 at configuration-time to determine the behaviour for that application, or flags could be set per lookup table entry to specify which behaviour is used when there are multiple hits for more than one buffer address in that entry.

This automatic loading of input channel data into hardware buffers eliminates a key bottleneck of existing triggered instruction designs: triggering based on the tags of all input channels. Triggering instructions directly off tags becomes significantly more inefficient in pipelined systems where the value of tags behind the next item in the queue is also to be considered. Instead, in the proposed technique, the tags are used to allocate to buffers and which buffer the data is in communicates to the software what the data is for. Therefore, the triggering system only has to consider the full/empty flags for the buffers as opposed to tag values for specific input data. Nevertheless, support for triggering instructions based on tags directly can still be supported to handle corner cases, but the support for the buffers means that the amount of tag/data storage in the holding area and circuit logic for checking whether the tags in the holding area 18 satisfy instruction trigger conditions can be greatly reduced.

Some embodiments may enable random access to the Input Blocks. This can either be achieved through allowing the raw addresses appearing (as read-only) in the processing element software register address space, or without modification by using buffers with lengths of 1.

Figure 10:
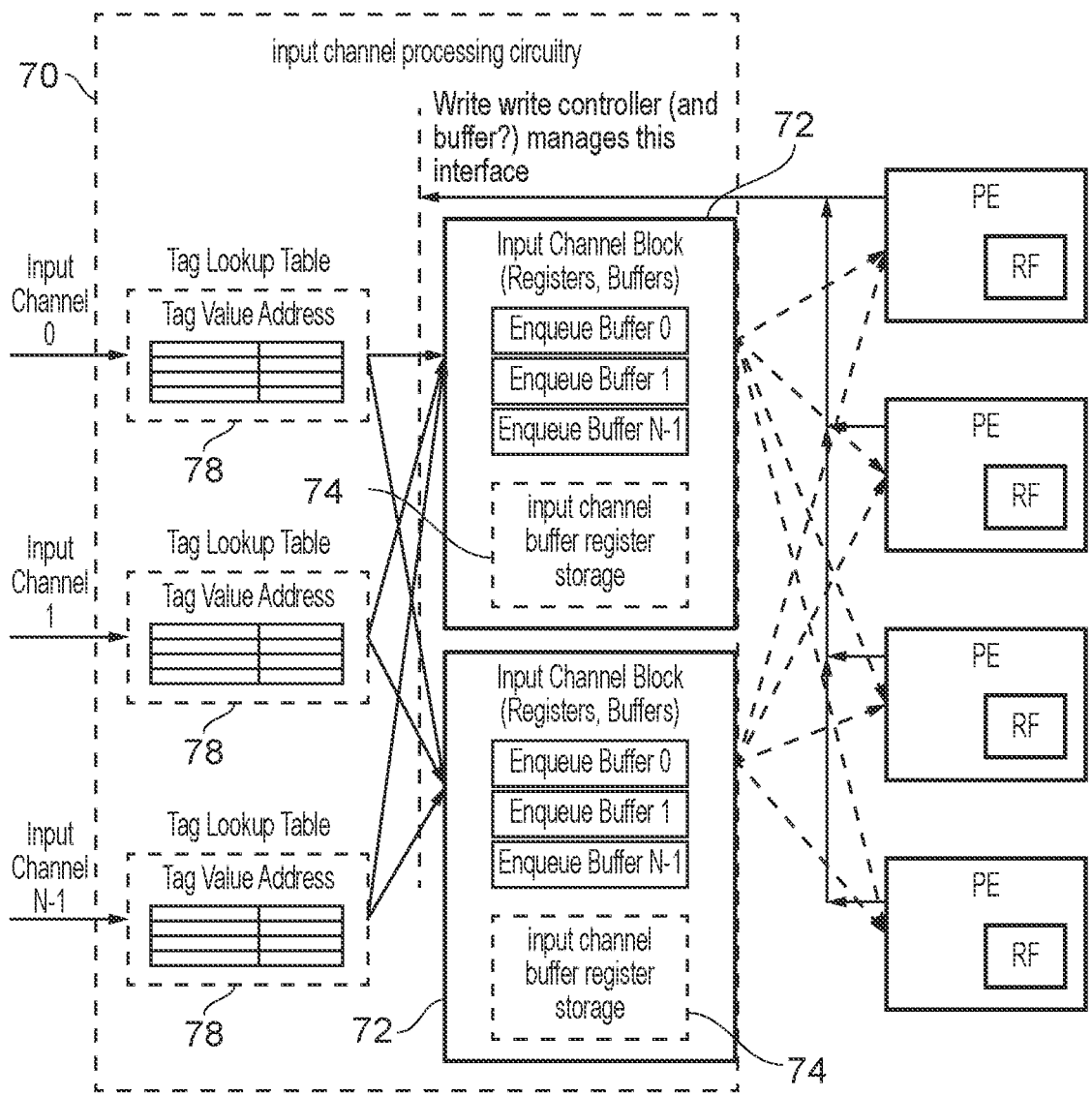
FIG. 10 illustrates an example of the input channel processing circuitry being shared between multiple triggered-instruction processing elements.

As shown in FIG. 10, it is also possible for the input channel processing circuitry 70 to be shared between multiple PEs (CTs). Network on Chip overheads are large and lightweight communication to nearby or neighbouring PEs is usually efficient and well aligned to the configurability paradigm exploited by these architectures. For example, application performance can be improved though partially configuring communications between neighbouring PEs through configurable buffers.

In such a scheme, a PE can not only read from one of the buffers in the input channel, but also write to one, which appears to the input write controller as another input channel. The above configuration can enable synchronized inter-PE communication in a small cluster of local PEs that share a set of input channels. Consider a system of several PEs, each with a local address space, optionally having local hardware buffers and all sharing one or more input channel blocks. These input channel blocks are served by multiple input channels but are also writable from each PE. The input channels can enqueue to any of the buffers in any of the input blocks 72. Furthermore, the local address space of each PE has Enqueue/Dequeue register addresses for each buffer in the input block 72 (in addition to any hardware buffers inside the local RF itself). These additional register addresses enable reading from any buffer in any of the input blocks. Furthermore, a PE can write into an input channel. This goes through the input write controller, and there is no guarantee when the write to a buffer (or transpose unit) will occur. However, the instructions in each PE can be triggered by the buffer full/empty event signals, enabling synchronization. Since the lengths of the buffers is configured in advance, the length of the buffers themselves and hardware signals (which can trigger instructions in any of the PEs) simplify control flow overhead in inter-PE communication. Software may operate the buffers in a "fill, then empty" fashion or in a circular fashion where data can be enqueued by a producer and dequeued by a consumer in any order—the use of the data depends on the way in which trigger conditions are set for the instructions which will access the buffers.

Reads are still single cycle, but there is a limit on how many PEs can read which read ports of which input channels. Some embodiments may patch these input channel read ports to PE memory map read ports in advance, others may enable dynamic switching, with either static checking to ensure it is impossible to run out of ports, or an online checker that would handle the contention issue.

Therefore, in a system with the input blocks and inter-PE communications, a unit of the designs is defined with X input channels, Y input channel blocks 72 (containing N hardware buffers, and Z PEs (each potentially having its own register file with M hardware buffers inside).

Any PE can dequeue any input channel buffer, just like it was dequeuing its own local RF buffer (and can be used as the source of any instruction etc., since it is equivalent to a register file read). Any PE can write to the input channel block, but the write will go into a queue, effectively behaving like another input channel into the block. An instruction in one PE can be triggered by full/empty of any input channel buffer. These signals are routed/configured at configuration time with multi-cycle delays to minimise circuit complexity—i.e. a PE triggering unit cannot see all event signals at once—but when instructions are loaded it is possible to configure 'hardware trigger slots' in each PE which a subset of chosen hardware events are routed into.

Figure 11:
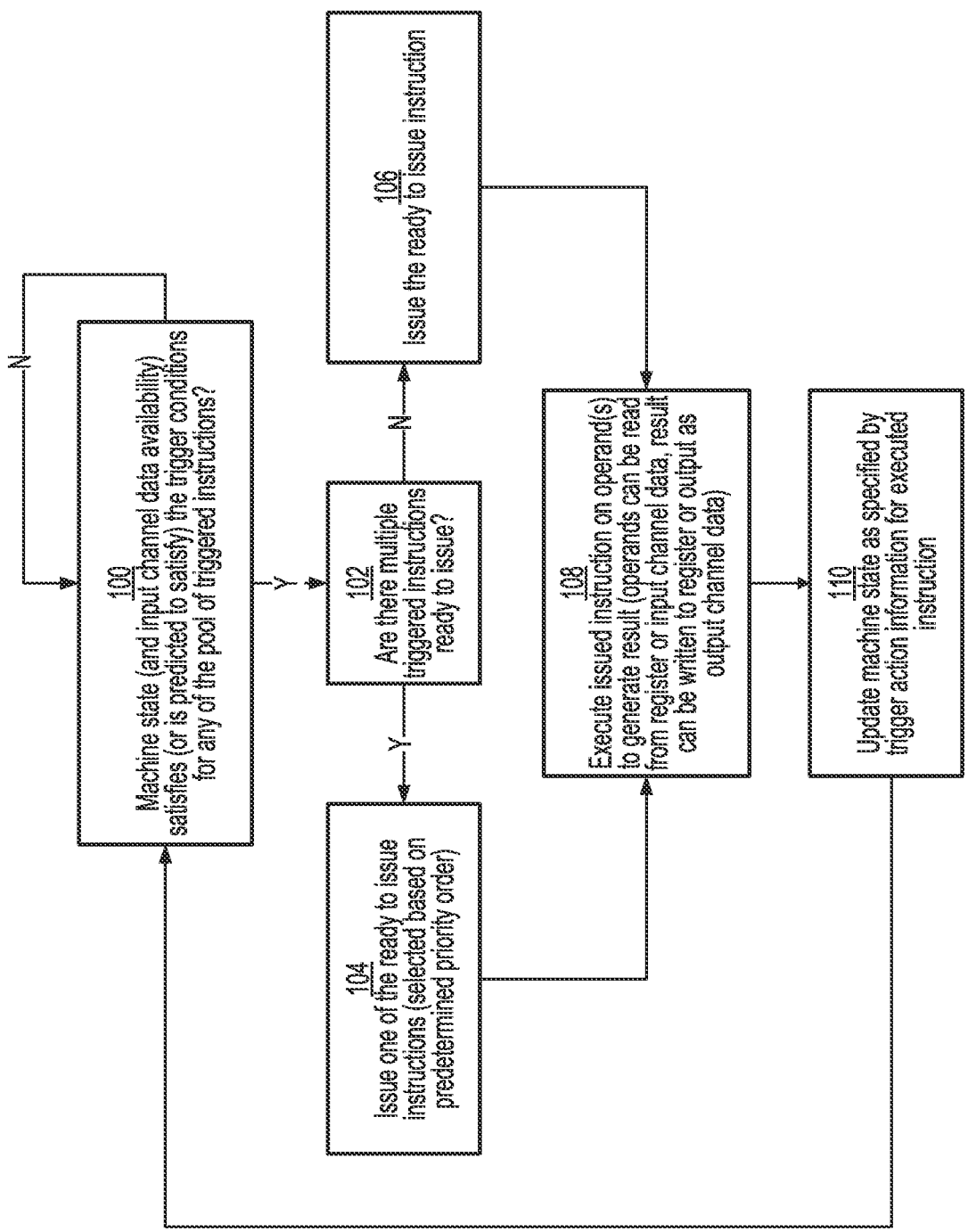
FIG. 11 is a flow diagram illustrating a method of processing instructions according to a triggered instruction architecture.

FIG. 11 is a flow diagram illustrating processing of triggered instructions on a triggered-instruction processing element. At step 100, the instruction issuing circuitry 12 of the processing element determines whether the machine state 22 (and input channel data availability, if relevant for any particular instruction) satisfies, or is predicted to satisfy, the trigger conditions for any of the pool of triggered instructions stored in the triggered-instruction storage circuitry 11. If not, then the instruction issuing circuitry 12 waits for a time when an instruction is determined or predicted to satisfy its trigger conditions. If multiple triggered instructions are ready to issue (step 102), then at step 104 the issuing circuitry issues one of the ready to issue instructions which is selected based on a predetermined priority order (e.g. the storage order of the instructions in memory). Otherwise, if there is only one instruction ready to issue, that instruction is issued at step 106. At step 108 the execution circuitry 14 executes the issued instruction on one or more operands to generate a result value. The operands can be read from local registers 16 or from input channel data stored in the input channel data holding area 18, or can be dequeued data which is dequeued from one of the input data buffers managed by the input channel processing circuitry 70. The result value can be written to a local register 16, output as output channel data, or enqueued onto one of the buffers managed by the input channel processing circuitry 70. At step 110, the execution circuitry 16 also triggers an update to the machine state 22 based on the trigger action information 48 specified by the executed instruction.

Figure 12:
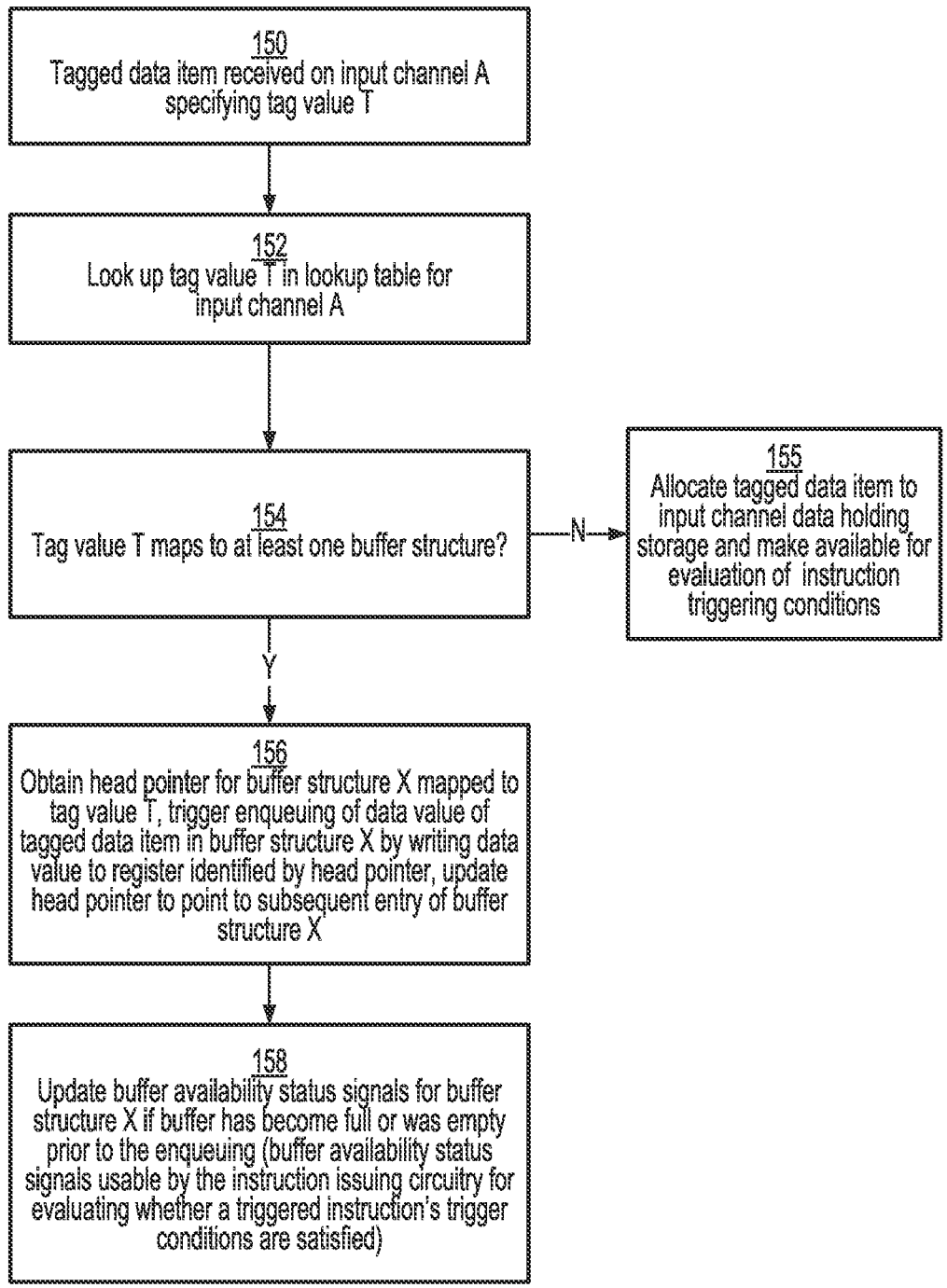
FIG. 12 is a flow diagram illustrating a method of processing a tagged data item received on an input channel.

FIG. 12 is a flow diagram illustrating enqueuing of input channel data (in hardware) under control of the input channel processing circuitry 70. At step 150, a tagged data item 50 is received on input channel A specifying a particular tag value T. At step 152, tag value T is looked up in a lookup table 78 associated with input channel A. At step 154, the input channel processing circuitry 70 determines whether tag value T maps to at least one buffer structure. If not, then at step 155 the tagged data item is allocated to the input channel data holding storage 18 for a corresponding PE, and is made available for evaluation of instruction triggering conditions for the triggered instructions executed by the PE. If the tag value T does map to at least one buffer structure (e.g. buffer X), then at step 156 the relevant input block 72 associated with the mapped buffer structure X obtains the head pointer for buffer structure X, triggers enqueuing of the data value of the received tagged data item in buffer structure X by writing the data value to a register (of register storage 74, 16) that is identified by the head pointer, and updates the head pointer to point to a register representing the subsequent entry of buffer structure X after the entry previously indicated by the head pointer (with a wraparound to the entry at the beginning of the buffer if the head pointer has reached the end of the buffer). At step 158, the input channel processing circuitry 70 updates any buffer availability status signals for buffer structure X, if the buffer has become full or was empty prior to the enqueuing, so as to track whether the buffer is full or empty. The buffer availability status signals are usable by the instruction issuing circuitry 12 of the processing element for evaluating whether a triggered instruction's trigger conditions are satisfied. Steps 156 and 158 can be performed multiple times for different buffer structures, if the tag lookup maps the tag value T to multiple buffers and multicasting of a data item to more than one buffer structure is supported as discussed for FIG. 9.

Figure 13:
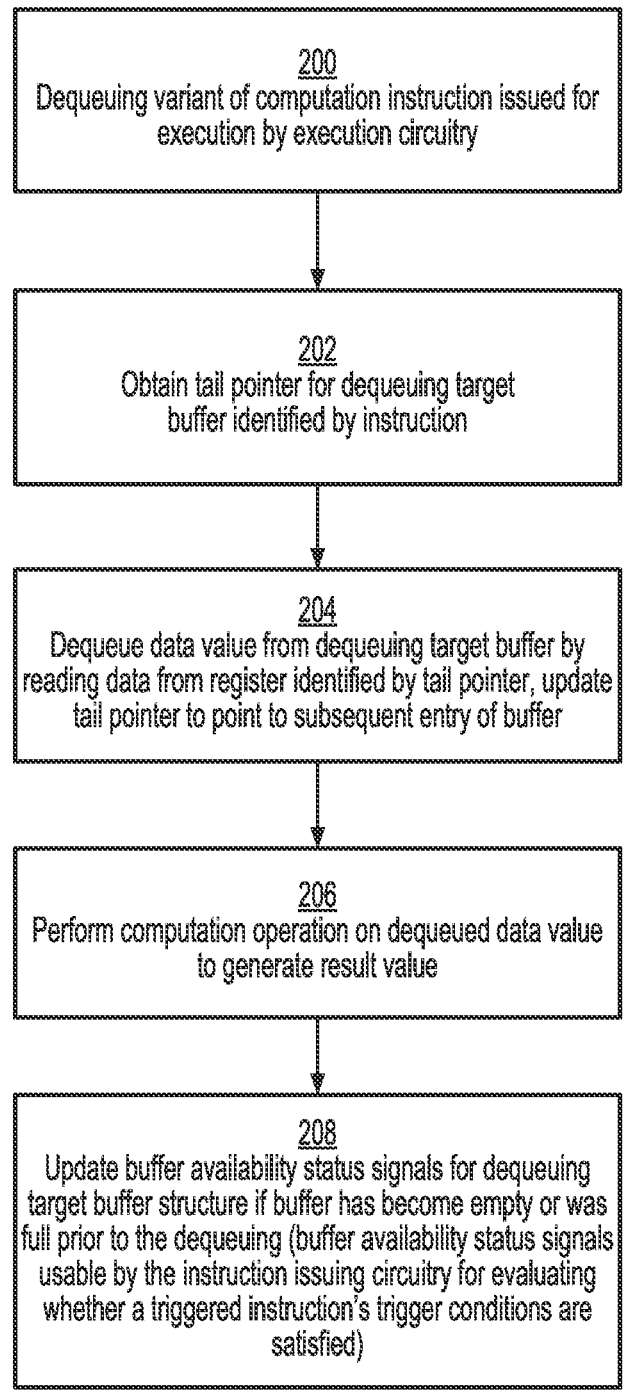
FIG. 13 is a flow diagram illustrating dequeuing an item from a target buffer structure.

FIG. 13 is a flow diagram illustrating processing of a dequeuing variant of a computation instruction by the triggered-instruction processing element. At step 200, a dequeuing variant of the computation instruction is issued by the instruction issuing circuitry 12 for execution by the execution circuitry 16. The dequeuing variant specifies a dequeuing target buffer (e.g. by specifying the dequeuing register 76 for that buffer in one of its source register fields). At step 202, a tail pointer for the dequeuing target buffer is obtained, and at step 204, a data value is dequeued from the dequeuing target buffer, by reading data from a register (in register storage 74, 16) identified by the tail pointer. The tail pointer is updated to point to a subsequent entry of the buffer (wrapping around to the start of the buffer if the end of the buffer has been reached). At step 206, execution circuitry 16 performs the computation operation on the dequeued data value to generate a result value. Also, at step 208 buffer availability status signals for the dequeuing target buffer structure are updated, if the buffer has become empty or was full prior to dequeuing. Again, these buffer availability status signals can be used to trigger execution of instructions as discussed above.

Figure 14:
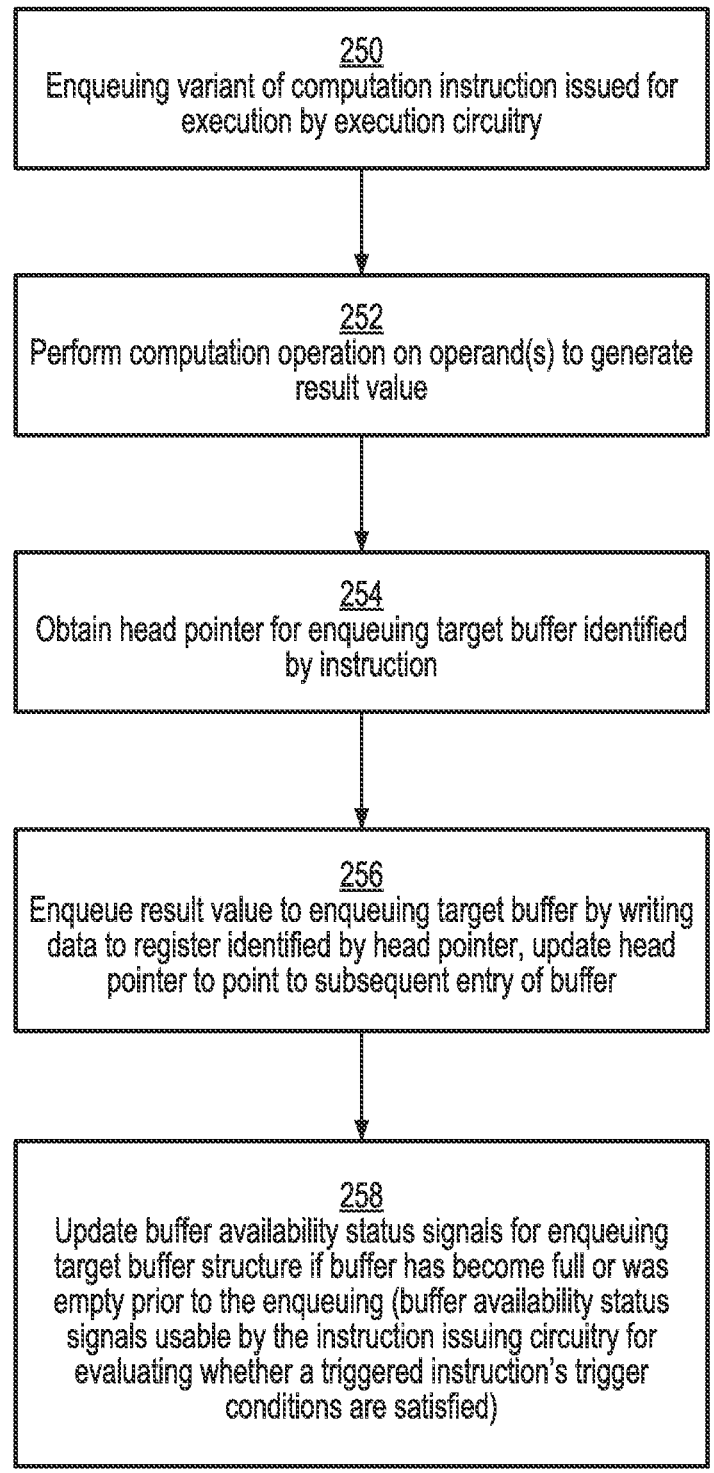
FIG. 14 is a flow diagram illustrating enqueuing an item on a target buffer structure.

FIG. 14 is a flow diagram illustrating processing of an enqueuing variant of a computation instruction by the triggered-instruction processing element. The instruction specifies an enqueuing target buffer (e.g. by specifying the dequeuing/enqueuing register 76 for that buffer in its destination register field). At step 250, the enqueuing variant of the computation instruction is issued by the instruction issuing circuitry 12 for execution by the execution circuitry 16. At step 252, the execution circuitry performs a computation operation on one or more operands to generate a result value. At step 254, the head pointer for the enqueuing target buffer identified by the instruction is obtained. At step 256, the result value of the computation is enqueued to the enqueuing target buffer by writing data to a register (in register storage 74 or 16) identified by the head pointer. The head pointer is updated to point to a subsequent entry of the buffer (again with a wraparound if necessary). At step 258, the buffer availability status signals for the enqueuing target buffer structure are updated if the buffer has become full or is no longer empty, as at step 158 of FIG. 12.

It will be appreciated that some competition instructions may act as both the dequeuing and enqueuing variants, in which case the operations shown in FIGS. 13 and 14 may be combined (but with a single instance of performing the computation operation—steps 206 and 252 would be the same step).

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Some examples are set out in the following clauses:

(1) An apparatus comprising:
  at least one triggered-instruction processing element, a given triggered-instruction processing element comprising execution circuitry to execute processing operations in response to instructions according to a triggered instruction architecture; and
  input channel processing circuitry to receive a given tagged data item for a given input channel, the given tagged data item comprising a data value and a tag value, and in response to receipt of the given tagged data item to control enqueuing of the data value of the given tagged data item to a selected buffer structure selected from among a plurality of buffer structures mapped onto register storage which is accessible to one or more of said at least one triggered-instruction processing element in response to a computation instruction for controlling performance of a computation operation; in which:
  the input channel processing circuitry is configured to select the selected buffer structure based at least on the tag value, so that data values of tagged data items specifying different tag values for the given input channel are allocatable to different buffer structures of the plurality of buffer structures.

(2) The apparatus according to clause (1), comprising a plurality of triggered-instruction processing elements.

(3) The apparatus according to clause (2), in which the plurality of triggered-instruction processing elements are coupled by an on-chip interconnect.

(4) The apparatus according to any of clauses (1) to (3), in which said given triggered-instruction processing element comprises:
triggered-instruction storage circuitry to store a trigger-checking pool of two or more triggered instructions each specifying a trigger condition field for providing trigger condition information indicative of at least one trigger condition for controlling whether the triggered instruction is to be issued for execution and a trigger action field for providing trigger action information indicative of at least one trigger action for updating machine state in response to the triggered instruction; and
instruction issuing circuitry to issue for execution a triggered instruction for which the machine state is determined or predicted to satisfy the at least one trigger condition.

(5) The apparatus according to clause (4), in which, for at least one encoding of the trigger condition information, the instruction issuing circuitry is configured to determine whether the at least one trigger condition is satisfied by the machine state depending on at least one buffer status signal indicative of whether a given buffer structure of the plurality of buffer structures is full or empty.

(6) The apparatus according to any of clauses (4) and (5), in which, for at least one encoding of the trigger condition information, the instruction issuing circuitry is configured to determine whether the at least one trigger condition is satisfied by the machine state depending on at least one input data availability condition indicating whether a tagged data item having a specified tag value is available on a specified input channel.

(7) The apparatus according to clause (6), in which, in response to a determination that the given tagged data item specifies a tag value not mapped to any of the plurality of buffer structures, the input channel processing circuitry is configured to make the given tagged data item available for checking of the at least one input data availability condition by the instruction issuing circuitry.

(8) The apparatus according to any preceding clause, in which the input channel processing circuitry is configured to receive the given tagged data item from at least one of:
an on-chip communication interconnect;
a memory access control unit associated with a cluster of one or more triggered-instruction processing elements that comprises a target triggered-instruction processing element which is to process the given tagged data item;
another triggered-instruction processing element outside the cluster comprising the target triggered-instruction processing element which is to process the given tagged data item;
a memory access control unit associated with another triggered-instruction processing element outside the cluster comprising the target triggered-instruction processing element which is to process the given tagged data item; and
the target triggered-instruction processing element which is to process the given tagged data item.

(9) The apparatus according to any preceding clause, in which the input channel processing circuitry is shared between two or more triggered-instruction processing elements and is capable of controlling enqueuing of the given tagged data item in a buffer structure mapped to register storage accessible to any of the two or more triggered-instruction processing elements.

(10) The apparatus according to any preceding clause, in which:
in response to a dequeuing variant of the computation instruction, the execution circuitry of a given triggered-instruction processing element is configured to dequeue a data value from a dequeuing target buffer structure specified by the dequeuing variant of the computation instruction, and perform a computation operation on the data value dequeued from the dequeuing target buffer structure.

(11) The apparatus according to clause (10), in which dequeuing a data value from the target buffer structure comprises reading dequeued data from a register of the register storage identified as a tail entry of the target buffer structure by a tail pointer associated with the target buffer structure, and updating the tail pointer to identify a register representing a subsequent entry of the target buffer structure.

(12) The apparatus according to any of clauses (10) and (11), in which the dequeuing variant of the computation instruction comprises a computation instruction specifying a source operand field with a value specifying a buffer dequeuing register corresponding to the dequeuing target buffer structure, the buffer dequeuing register being one of a set of one or more buffer dequeuing registers corresponding to one or more buffer structures; and
in response to the computation instruction when the source operand field specifies a source register other than said set of one or more buffer dequeuing registers, the execution circuitry is configured to obtain an operand data value from the source register specified by the operand field and perform the computation operation on the operand data value obtained from the source register.

(13) The apparatus according to any preceding clause, in which in response to an enqueuing variant of the computation instruction, the execution circuitry is configured to perform a computation operation to generate a result value and enqueue the result value to an enqueuing target buffer structure specified by the enqueuing variant of the computation instruction.

(14) The apparatus according to any preceding clause, in which the input channel processing circuitry comprises a plurality of input channel processing blocks supporting parallel processing of respective tagged data items so that the respective tagged data items are writable in parallel to respective locations of the plurality of buffer structures.

(15) The apparatus according to any preceding clause, in which the input channel processing circuitry is configured to select the selected buffer structure based on the tag value and the given input channel associated with the given tagged data item, so that tagged data items specifying the same tag value received on different input channels are allocatable to different buffer structures.

(16) The apparatus according to any preceding clause, in which the input channel processing circuitry comprises lookup circuitry to look up the tag value of the given tagged data item in a lookup table corresponding to the given input channel, the lookup table mapping the tag value to an indication of at least one corresponding buffer structure.

(17) The apparatus according to clause (16), in which the input channel processing circuitry is configured to use the indication of the at least one corresponding buffer structure to select a storage location to be read to provide at least one of:
  a processing element identifier identifying a target triggered-instruction processing element at which the at least one corresponding buffer structure is mapped onto register storage of that triggered-instruction processing element;
  an input channel processing block identifier identifying one of a plurality of input channel processing blocks for controlling enqueuing of data onto respective sets of buffer structures;
  a buffer structure identifier distinguishing two or more buffer structures mapped onto register storage of the target triggered-instruction processing element; and
  a head pointer indicating a register of the target triggered-instruction processing element to which the data value of the given tagged data item is to be written.

(18) The apparatus according to any of clauses (16) and (17), in which the lookup table has fields for mapping the tag value to indications of a plurality of corresponding buffer structures in which the data item specifying the tag value is capable of being enqueued.

(19) The apparatus according to clause (18), in which when the lookup table specifies that the tag value maps to two or more corresponding buffer structures, the input channel processing circuitry is configured to select, based on buffer status signals indicative of which of the two or more corresponding buffer structures are full, a selected available buffer structure which is not full from among the two or more corresponding buffer structures, and control enqueuing of the data value of the given tagged data item in the selected available buffer structure.

(20) The apparatus according to clause (18), in which when the lookup table specifies that the tag value maps to two or more corresponding buffer structures, the input channel processing circuitry is configured to control enqueuing of the data value of the given tagged data item in each of said two or more corresponding buffer structures.

(21) The apparatus according to any preceding clause, in which the triggered instruction architecture supports at least one instruction for controlling the execution circuitry to make a random-access read/write to an entry of a given buffer structure.

(22) The apparatus according to any preceding clause, in which the register storage is local register storage of said at least one of the triggered-instruction processing elements, which is also accessible in response to an instruction triggering a register access other than an access to one of said plurality of buffer structures.

(23) The apparatus according to any of clauses (1) to (21), in which the register storage is separate from local register storage of said at least one of the triggered-instruction processing elements accessible in response to an instruction triggering a register access other than an access to one of said plurality of buffer structures.

(24) The apparatus according to any of clauses (1) to (23) in which an instruction specifying a register specifier used to access the at least one buffer structure comprises a computation instruction which also controls the triggered-instruction processing element which executes the instruction to perform a computation operation using a data value accessed from the at least one buffer structure.

(25) The apparatus according to any of clauses (1) to (24), in which the given triggered-instruction processing element comprises trigger condition prediction circuitry to predict which triggered instructions are expected to have their trigger conditions satisfied, and instruction issuing circuitry to issue for execution an instruction predicted by the trigger condition prediction circuitry as being expected to have its trigger condition satisfied.

(26) A method for an apparatus comprising at least one triggered-instruction processing element, a given triggered-instruction processing element comprising execution circuitry to execute processing operations in response to instructions according to a triggered instruction architecture;
  the method comprising:
    receiving a given tagged data item for a given input channel, the given tagged data item comprising a data value and a tag value; and
    in response to receipt of the given tagged data item, controlling enqueuing of the data value of the given tagged data item to a selected buffer structure selected from among a plurality of buffer structures mapped onto register storage which is accessible to one or more of said at least one triggered-instruction processing element in response to a computation instruction for controlling performance of a computation operation; in which:
    the selected buffer structure is selected based at least on the tag value, so that data values of tagged data items specifying different tag values for the given input channel are allocatable to different buffer structures of the plurality of buffer structures.

(27) Computer-readable code for fabrication of an apparatus comprising:
  at least one triggered-instruction processing element, a given triggered-instruction processing element comprising execution circuitry to execute processing operations in response to instructions according to a triggered instruction architecture; and
  input channel processing circuitry to receive a given tagged data item for a given input channel, the given tagged data item comprising a data value and a tag value, and in response to receipt of the given tagged data item to control enqueuing of the data value of the given tagged data item to a selected buffer structure selected from among a plurality of buffer structures mapped onto register storage which is accessible to one or more of said triggered-instruction processing element in response to a computation instruction for controlling performance of a computation operation; in which:
  the input channel processing circuitry is configured to select the selected buffer structure based at least on the tag value, so that data values of tagged data items specifying different tag values for the given input channel are allocatable to different buffer structures of the plurality of buffer structures.

(28) A storage medium storing the computer-readable code of clause (27).

(29) A non-transitory storage medium storing the computer-readable code of clause (27).

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

In the present application, lists of features preceded with the phrase "at least one of" mean that any one or more of those features can be provided either individually or in combination. For example, "at least one of: A, B and C" encompasses any of the following options: A alone (without B or C), B alone (without A or C), C alone (without A or B), A and B in combination (without C), A and C in combination (without B), B and C in combination (without A), or A, B and C in combination.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:
at least one triggered-instruction processing element, a given triggered-instruction processing element comprising execution circuitry to execute processing operations in response to instructions according to a triggered instruction architecture; and
input channel processing circuitry to receive a given tagged data item for a given input channel, the given tagged data item comprising a data value and a tag value, and in response to receipt of the given tagged data item to control enqueuing of the data value of the given tagged data item to a selected buffer structure selected from among a plurality of buffer structures mapped onto register storage which is accessible to one or more of said at least one triggered-instruction processing element in response to a computation instruction for controlling performance of a computation operation; in which:
the input channel processing circuitry is configured to select the selected buffer structure based at least on the tag value, so that data values of tagged data items specifying different tag values for the given input channel are allocatable to different buffer structures of the plurality of buffer structures; and
said given triggered-instruction processing element comprises:
triggered-instruction storage circuitry to store a trigger-checking pool of two or more triggered instructions each specifying a trigger condition field for providing trigger condition information indicative of at least one trigger condition for controlling whether the triggered instruction is to be issued for execution and a trigger action field for providing trigger action information indicative of at least one trigger action for updating machine state in response to the triggered instruction; and
instruction issuing circuitry to issue for execution a triggered instruction for which the machine state is determined or predicted to satisfy the at least one trigger condition.

2. The apparatus according to claim 1, in which, for at least one encoding of the trigger condition information, the instruction issuing circuitry is configured to determine whether the at least one trigger condition is satisfied by the machine state depending on at least one buffer status signal indicative of whether a given buffer structure of the plurality of buffer structures is full or empty.

3. The apparatus according to claim 1, in which, for at least one encoding of the trigger condition information, the instruction issuing circuitry is configured to determine whether the at least one trigger condition is satisfied by the machine state depending on at least one input data availability condition indicating whether a tagged data item having a specified tag value is available on a specified input channel.

4. The apparatus according to claim 3, in which, in response to a determination that the given tagged data item specifies a tag value not mapped to any of the plurality of buffer structures, the input channel processing circuitry is configured to make the given tagged data item available for checking of the at least one input data availability condition by the instruction issuing circuitry.

5. The apparatus according to claim 1, in which the input channel processing circuitry is configured to receive the given tagged data item from at least one of:
an on-chip communication interconnect;
a memory access control unit associated with a cluster of one or more triggered-instruction processing elements that comprises a target triggered-instruction processing element which is to process the given tagged data item;
another triggered-instruction processing element outside the cluster comprising the target triggered-instruction processing element which is to process the given tagged data item;
a memory access control unit associated with another triggered-instruction processing element outside the cluster comprising the target triggered-instruction processing element which is to process the given tagged data item; and
the target triggered-instruction processing element which is to process the given tagged data item.

6. The apparatus according to claim 1, in which the input channel processing circuitry is shared between two or more triggered-instruction processing elements and is capable of controlling enqueuing of the given tagged data item in a buffer structure mapped to register storage accessible to any of the two or more triggered-instruction processing elements.

7. The apparatus according to claim 1, in which:
in response to a dequeuing variant of the computation instruction, the execution circuitry is configured to dequeue a data value from a dequeuing target buffer structure specified by the dequeuing variant of the computation instruction, and perform a computation operation on the data value dequeued from the dequeuing target buffer structure.

8. The apparatus according to claim 7, in which dequeuing a data value from the target buffer structure comprises reading dequeued data from a register of the register storage identified as a tail entry of the target buffer structure by a tail pointer associated with the target buffer structure, and updating the tail pointer to identify a register representing a subsequent entry of the target buffer structure.

9. The apparatus according to claim 7, in which the dequeuing variant of the computation instruction comprises a computation instruction specifying a source operand field with a value specifying a buffer dequeuing register corresponding to the dequeuing target buffer structure, the buffer dequeuing register being one of a set of one or more buffer dequeuing registers corresponding to one or more buffer structures; and in response to the computation instruction when the source operand field specifies a source register other than said set of one or more buffer dequeuing registers, the execution circuitry is configured to obtain an operand data value from the source register specified by the operand field and perform the computation operation on the operand data value obtained from the source register.

10. The apparatus according to claim 1, in which in response to an enqueuing variant of the computation instruction, the execution circuitry is configured to perform a computation operation to generate a result value and enqueue the result value to an enqueuing target buffer structure specified by the enqueuing variant of the computation instruction.

11. The apparatus according to claim 1, in which the input channel processing circuitry comprises a plurality of input channel processing blocks supporting parallel processing of respective tagged data items so that the respective tagged data items are writable in parallel to respective locations of the plurality of buffer structures.

12. The apparatus according to claim 1, in which the input channel processing circuitry is configured to select the selected buffer structure based on the tag value and the given input channel associated with the given tagged data item, so that tagged data items specifying the same tag value received on different input channels are allocatable to different buffer structures.

13. The apparatus according to claim 1, in which the input channel processing circuitry comprises lookup circuitry to look up the tag value of the given tagged data item in a lookup table corresponding to the given input channel, the lookup table mapping the tag value to an indication of at least one corresponding buffer structure.

14. The apparatus according to claim 13, in which the input channel processing circuitry is configured to use the indication of the at least one corresponding buffer structure to select a storage location to be read to provide at least one of:

a processing element identifier identifying a target triggered-instruction processing element at which the at least one corresponding buffer structure is mapped onto register storage of that triggered-instruction processing element;

an input channel processing block identifier identifying one of a plurality of input channel processing blocks for controlling enqueuing of data onto respective sets of buffer structures;

a buffer structure identifier distinguishing two or more buffer structures mapped onto register storage of the target triggered-instruction processing element; and a head pointer indicating a register of the target triggered-instruction processing element to which the data value of the given tagged data item is to be written.

15. The apparatus according to claim 13, in which the lookup table has fields for mapping the tag value to indications of a plurality of corresponding buffer structures in which the data item specifying the tag value is capable of being enqueued.

16. The apparatus according to claim 15, in which when the lookup table specifies that the tag value maps to two or more corresponding buffer structures, the input channel processing circuitry is configured to select, based on buffer status signals indicative of which of the two or more corresponding buffer structures are full, a selected available buffer structure which is not full from among the two or more corresponding buffer structures, and control enqueuing of the data value of the given tagged data item in the selected available buffer structure.

17. The apparatus according to claim 15, in which when the lookup table specifies that the tag value maps to two or more corresponding buffer structures, the input channel processing circuitry is configured to control enqueuing of the data value of the given tagged data item in each of said two or more corresponding buffer structures.

18. A method for an apparatus comprising at least one triggered-instruction processing element, a given triggered-instruction processing element comprising execution circuitry to execute processing operations in response to instructions according to a triggered instruction architecture, the method comprising:

storing a trigger-checking pool of two or more triggered instructions each specifying a trigger condition field for providing trigger condition information indicative of at least one trigger condition for controlling whether the triggered instruction is to be issued for execution and a trigger action field for providing trigger action information indicative of at least one trigger action for updating machine state in response to the triggered instruction;

issuing for execution a triggered instruction for which the machine state is determined or predicted to satisfy the at least one trigger condition;

receiving a given tagged data item for a given input channel, the given tagged data item comprising a data value and a tag value; and in response to receipt of the given tagged data item, controlling enqueuing of the data value of the given tagged data item to a selected buffer structure selected from among a plurality of buffer structures mapped onto register storage which is accessible to one or more of said at least one triggered-instruction processing element in response to a computation instruction for controlling performance of a computation operation; in which:

the selected buffer structure is selected based at least on the tag value, so that data values of tagged data items specifying different tag values for the given input channel are allocatable to different buffer structures of the plurality of buffer structures.

19. A non-transitory storage medium storing computer-readable code for fabrication of an apparatus comprising:

at least one triggered-instruction processing element, a given triggered-instruction processing element comprising execution circuitry to execute processing operations in response to instructions according to a triggered instruction architecture; and input channel processing circuitry to receive a given tagged data item for a given input channel, the given tagged data item comprising a data value and a tag value, and in response to receipt of the given tagged data item to control enqueuing of the data value of the given tagged data item to a selected buffer structure selected from among a plurality of buffer structures mapped onto register storage which is accessible to one or more of said at least one triggered-instruction processing element in response to a computation instruction for controlling performance of a computation operation; in which:

the input channel processing circuitry is configured to select the selected buffer structure based at least on the tag value, so that data values of tagged data items specifying different tag values for the given input channel are allocatable to different buffer structures of the plurality of buffer structures; and said given triggered-instruction processing element comprises:

triggered-instruction storage circuitry to store a trigger-checking pool of two or more triggered instructions each specifying a trigger condition field for providing trigger condition information indicative of at least one trigger condition for controlling whether the triggered instruction is to be issued for execution and a trigger action field for providing trigger action information indicative of at least one trigger action for updating machine state in response to the triggered instruction; and instruction issuing circuitry to issue for execution a triggered instruction for which the machine state is determined or predicted to satisfy the at least one trigger condition.

* * * * *